(12) United States Patent
Jorapur et al.

(10) Patent No.: US 11,966,302 B2
(45) Date of Patent: *Apr. 23, 2024

(54) UPDATING A VIRTUAL MACHINE BACKUP

(71) Applicant: Cohesity, Inc., San Jose, CA (US)

(72) Inventors: Raghavendra Gururao Jorapur, Pune (IN); Vidhata Jain, Pune (IN); Joydip Datta, Pune (IN); Niket Vilas Bagwe, Pune (IN); Rajashree Dashrath Thorat, Pune (IN)

(73) Assignee: Cohesity, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,901

(22) Filed: Aug. 24, 2022

(65) Prior Publication Data
US 2023/0058980 A1    Feb. 23, 2023

Related U.S. Application Data

(63) Continuation of application No. 16/912,154, filed on Jun. 25, 2020, now Pat. No. 11,467,917.

(51) Int. Cl.
*G06F 16/00* (2019.01)
*G06F 8/65* (2018.01)
*G06F 9/455* (2018.01)
*G06F 11/14* (2006.01)

(52) U.S. Cl.
CPC ............ *G06F 11/1461* (2013.01); *G06F 8/65* (2013.01); *G06F 9/45558* (2013.01); *G06F 11/1469* (2013.01); *G06F 2009/45583* (2013.01); *G06F 2201/815* (2013.01)

(58) Field of Classification Search
None
See application file for complete search history.

(56) References Cited

U.S. PATENT DOCUMENTS

| | | | |
|---|---|---|---|
| 2015/0142750 A1 | 5/2015 | Mutalik | |
| 2015/0212893 A1* | 7/2015 | Pawar | G06F 11/1456 707/649 |
| 2015/0212894 A1* | 7/2015 | Pawar | G06F 11/1448 707/679 |
| 2015/0212895 A1* | 7/2015 | Pawar | G06F 16/128 707/649 |
| 2016/0004721 A1* | 1/2016 | Iyer | G06F 16/184 707/649 |
| 2016/0034481 A1* | 2/2016 | Kumarasamy | G06F 16/128 707/639 |
| 2016/0041880 A1* | 2/2016 | Mitkar | G06F 11/1469 707/680 |
| 2016/0042090 A1* | 2/2016 | Mitkar | G06F 11/1448 707/649 |

(Continued)

*Primary Examiner* — Farhan M Syed
(74) *Attorney, Agent, or Firm* — Shumaker & Sieffert, P.A.

(57) ABSTRACT

A virtual machine disk image file backup is selected among a plurality of virtual machine disk image file backups stored on a backup storage based on a backup update policy. A version of the selected virtual machine disk image file backup is mounted. Based on the backup update policy, an update to the mounted version of the selected virtual machine disk image file backup is applied without restoring the selected virtual machine disk image file backup. The updated version of the selected virtual machine disk image file backup is stored on the backup storage.

20 Claims, 15 Drawing Sheets

(56) References Cited

U.S. PATENT DOCUMENTS

| | | | | |
|---|---|---|---|---|
| 2016/0085574 A1* | 3/2016 | Dornemann | ............ | G06F 3/067 |
| | | | | 718/1 |
| 2016/0085575 A1* | 3/2016 | Dornemann | ........ | G06F 11/2094 |
| | | | | 718/1 |
| 2016/0085636 A1* | 3/2016 | Dornemann | ........ | G06F 9/45558 |
| | | | | 707/679 |
| 2016/0124764 A1 | 5/2016 | Nithrakashyap | | |
| 2016/0154709 A1* | 6/2016 | Mitkar | ................ | G06F 11/1466 |
| | | | | 707/649 |
| 2016/0292040 A1* | 10/2016 | Kumarasamy | ...... | G06F 11/1451 |
| 2017/0024152 A1* | 1/2017 | Bhagi | ................. | G06F 11/3034 |

* cited by examiner

400 ⟶

| TreeID | NodeID | ChildrenID | Ref Count | Value | ChunkID | Chunk FileID |
|---|---|---|---|---|---|---|
| 1 | FR1 | FI1, FI2 | 0 | | | |
| 1 | FI1 | FL1, FL2, FL3, FL4 | 2 | | | |
| 1 | FI2 | FL5, FL6, FL7, FL8 | 1 | | | |
| 1 | FL1 | | 1 | Brick 1 | SHA-1$_a$ | Chunk File 1 |
| 1 | FL2 | | 1 | Brick 2 | SHA-1$_b$ | Chunk File 1 |
| 1 | FL3 | | 1 | Brick 3 | SHA-1$_c$ | Chunk File 1 |
| 1 | FL4 | | 1 | Brick 4 | SHA-1$_d$ | Chunk File 1 |
| 1 | FL5 | | 2 | Brick 5 | SHA-1$_e$ | Chunk File 2 |
| 1 | FL6 | | 2 | Brick 6 | SHA-1$_f$ | Chunk File 2 |
| 1 | FL7 | | 2 | Brick 7 | SHA-1$_g$ | Chunk File 2 |
| 1 | FL8 | | 1 | Brick 8 | SHA-1$_h$ | Chunk File 2 |
| 2 | FR2 | FI1, FI3 | 0 | | | |
| 2 | FI3 | FL5, FL6, FL7, FL9 | 1 | | | |
| 2 | FL9 | | 1 | Brick 8' | SHA-1$_i$ | Chunk File 3 |

| Chunk File ID | Chunk ID | Chunk File Offset | Storage Node | Primary Owner | Secondary Owner |
|---|---|---|---|---|---|
| Chunk File 1 | SHA-1$_a$ | 0 – 256 kb | 1, 3 | File 1 | File 2 |
| Chunk File 1 | SHA-1$_b$ | 256 kb – 512 kb | 1, 3 | File 1 | File 2 |
| Chunk File 1 | SHA-1$_c$ | 512 kb – 768 kb | 1, 3 | File 1 | File 2 |
| Chunk File 1 | SHA-1$_d$ | 768 kb – 1024 kb | 1, 3 | File 1 | File 2 |
| Chunk File 2 | SHA-1$_e$ | 0 – 256 kb | 2, 4 | File 1 | File 2 |
| Chunk File 2 | SHA-1$_f$ | 256 kb – 512 kb | 2, 4 | File 1 | File 2 |
| Chunk File 2 | SHA-1$_g$ | 512 kb – 768 kb | 2, 4 | File 1 | File 2 |
| Chunk File 2 | SHA-1$_h$ | 768 kb – 1024 kb | 2, 4 | File 1 | - |
| Chunk File 3 | SHA-1$_i$ | 0 – 256 kb | 2, 3 | File 2 | - |

FIG. 4B

UPDATING A VIRTUAL MACHINE BACKUP

CROSS REFERENCE TO OTHER APPLICATIONS

This application is a continuation of U.S. patent application Ser. No. 16/912,154 entitled UPDATING A VIRTUAL MACHINE BACKUP filed Jun. 25, 2020 which is incorporated herein by reference for all purposes.

BACKGROUND OF THE INVENTION

A primary system may be running a virtual machine in a production environment. For example, the virtual machine may be running a database application and provide responses to a plurality of data queries. Data associated with the virtual machine may be backed up to a storage system. One or more security vulnerabilities associated with the virtual machine may be discovered after the virtual machine is backed up to the storage system.

The storage system may restore the virtual machine to the primary system or a different system. The restored virtual machine may be started in a production environment, but would expose the production environment to the one or more security vulnerabilities. Some systems may update the restored virtual machine with one or more updates, such as a software patch, to fix the one or more security vulnerabilities associated with the restored virtual machine before the virtual machine is used in the production environment. However, this may cause some delays in the production environment because a certain amount of time is needed to update the restored virtual machine before it can be used in the production environment.

BRIEF DESCRIPTION OF THE DRAWINGS

Various embodiments of the invention are disclosed in the following detailed description and the accompanying drawings.

FIG. 4A is a diagram illustrating a data structure in accordance with some embodiments.

FIG. 4B is a diagram illustrating a data structure in accordance with some embodiments.

DETAILED DESCRIPTION

Figure 1:
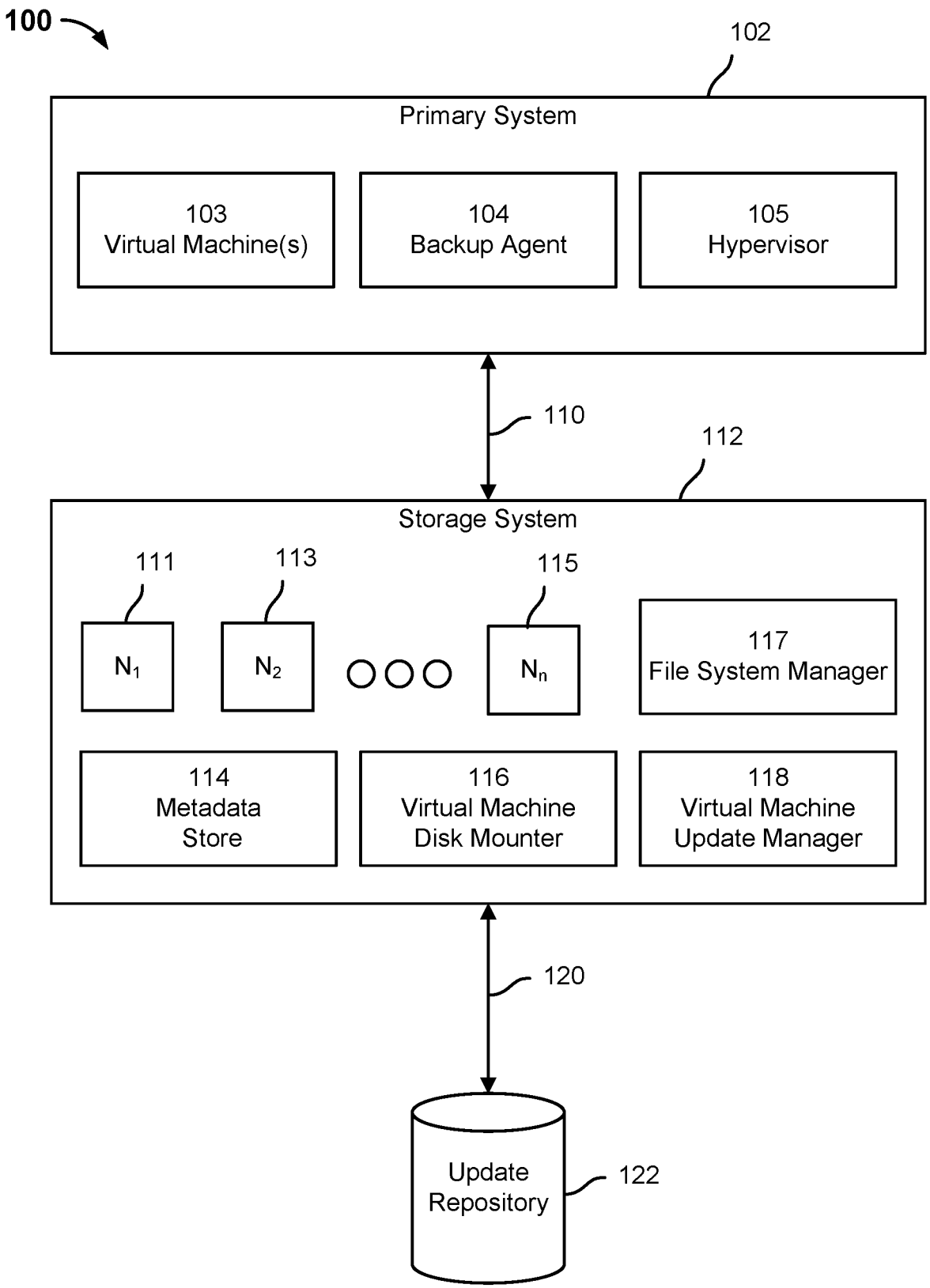
FIG. 1 is a block diagram illustrating an embodiment of a system for updating virtual machine disk image file backups.

A virtual machine may be backed up to a storage system. The contents of the virtual machine may be stored as a virtual machine disk image file. The virtual machine disk image file backup may be restored to a primary system that provides a production environment for one or more virtual machines, however, the virtual machine disk image file backup may require one or more updates before the virtual machine corresponding to the virtual machine disk image file backup is ready to be deployed. For example, one or more software patches may be applied to fix one or more security issues and/or vulnerabilities. One or more configuration files may be updated to adapt the virtual machine for the environment in which the virtual machine is to be deployed. Data stored by the virtual machine disk image file may be deleted for compliance reasons.

Other systems may apply the one or more updates after the virtual machine disk image file backup has been restored and a virtual machine corresponding to the virtual machine disk image file backup is running on a primary system. This can add significant delays to the time-to-production for the virtual machine. The time-to-production is the duration of time from when a virtual machine is requested to be restored to when the requested virtual machine is deployed to a production environment. These delays may be compounded when a plurality of virtual machines (e.g., hundreds, thousands, etc.) are restored to the production environment. Applying the one or more updates after the virtual machine disk image file backup has been restored to a primary system providing the production environment also uses the primary system's resources, which could be used for other purposes, such as running virtual machines for production purposes.

Using the techniques disclosed herein, in various embodiments, the storage system may apply the one or more updates to the virtual machine disk image file backup before the virtual machine disk image file backup is restored to a system such as a primary system; that is, a virtual machine disk image file backup may be updated without starting or running the virtual machine that corresponds to the virtual machine disk image file backup. A clone of a virtual machine disk image file backup may be generated and mounted. The one or more updates may be applied to the mounted virtual machine disk image file. The updated virtual machine disk image file backup is exported to the storage system and ready for deployment. For example, the updated virtual machine disk image file backup may be included in a catalog of available virtual machine disk image file backups.

Upon receiving a request to restore a virtual machine from a primary system, the storage system may restore the updated virtual machine disk image file backup to the primary system. When compared with other systems, the time-to-production has been reduced from the amount of time needed to restore the virtual machine disk image file backup to the primary system, to start the virtual machine corresponding to the restored virtual machine disk image file backup, and to apply the one or more updates to the virtual machine to the amount of time needed to restore the virtual machine disk image file backup. Furthermore, the primary system does not need to use its resources to update the virtual machine since that task has been offloaded to the storage system; rather, the primary system may use those resources for other purposes, such as to run the virtual machine.

FIG. 1 is a block diagram illustrating an embodiment of a system for updating virtual machine disk image file backups. In the example shown, system 100 is comprised of primary system 102, storage system 112, and update repository 122. Primary system 102 is coupled to storage system 112 via connection 110. Storage system 112 is coupled to update repository 122 via connection 120. Connections 110, 120 may be a wired or wireless connection. Connections 110, 120 may be a LAN, WAN, intranet, the Internet, and/or a combination thereof. In some embodiments, update repository is part of storage system 112.

Primary system 102 may host one or more virtual machines 103 (e.g., Linux virtual machine). Primary system 102 may include one or more storage volumes (not shown) to store the file system data associated with the one or more virtual machines 103. Primary system 102 may provide a production environment for the one or more virtual machines 103, that is, the one or more virtual machines 103 may provide live data to one or more requesting applications, services, processes, or devices. Primary system 102 may include a hypervisor 105 that is configured to create and run the one or more virtual machines 103. In some embodiments, a virtual machine is comprised of a plurality of drives. A user associated with the virtual machine may select one or more of the plurality of drives to include in a virtual machine disk image file backup.

A backup snapshot may be received by storage system 112. A backup snapshot may be a full backup snapshot or an incremental backup snapshot. A full backup snapshot may include all of the file system data of primary system 102 at a particular moment in time (e.g., all the file system data for all of the virtual machines 103). In some embodiments, a full backup snapshot includes all of the file system data associated with one of the one or more virtual machines 103 at a particular moment in time. In some embodiments, a full backup snapshot includes all of the file system data associated with some of the one or more virtual machines 103 at a particular moment in time. An incremental backup snapshot may include all of the file system data of primary system 102 that was not included in a previous backup snapshot. In some embodiments, an incremental backup snapshot includes all of the file system data associated with one of the one or more virtual machines 103 that was not included in a previous backup snapshot. In some embodiments, an incremental backup snapshot includes all of the file system data associated with some of the one or more virtual machines 103 that was not included in a previous backup snapshot.

Primary system 102 may include backup agent 104. In some embodiments, backup agent 104 is configured to cause primary system 102 to perform corresponding backup snapshots of its file system data. In some embodiments, backup agent 104 is configured to cause primary system 102 to perform corresponding backup snapshots of the one or more virtual machines 103. In some embodiments, backup agent 104 is configured to cause primary system 102 to perform corresponding backup snapshots of one of the one or more virtual machines 103. In some embodiments, primary system 102 includes a backup function and is configured to perform a backup snapshot on its own without backup agent 104. In some embodiments, a virtual machine includes its own backup function and is configured to perform a backup snapshot on its own without backup agent 104.

Primary system 102 may be configured to send a backup snapshot to storage system 112 according to one or more backup snapshot policies. A backup snapshot policy may indicate that file system data is to be backed up according to a schedule (e.g., hourly, daily, weekly, monthly, etc.), when a threshold size of data has changed, in response to a command from a user associated with primary system 102, in response to a request from storage system 112, etc.

Storage system 112 is comprised of a storage cluster that includes a plurality of storage nodes 111, 113, 115. Although three storage nodes are shown, storage system 112 may be comprised of n storage nodes. The plurality of storage nodes may be comprised of one or more solid state drives, one or more hard disk drives, or a combination thereof. Each storage node may have its own corresponding processor. Storage system 112 may be configured to ingest a backup snapshot received from primary system 102 and configured to store the data associated with the backup snapshot across the storage cluster.

Storage system 112 may be a cloud instantiation of a storage system. A configuration of a cloud instantiation of storage system 112 may be a virtual version of storage system 112. For example, storage system 112 may be comprised of three storage nodes, each storage node with a storage capacity of 10 TB. A cloud version of storage system 112 may be comprised of three virtual nodes, each virtual node with a storage capacity of 10 TB. Other storage capacities and configurations may be used.

Storage system 112 may receive the file system data included in a backup snapshot and generate a view of file system data. In some embodiments, a view of the file system data corresponding to the backup snapshot is generated for all of the file system data stored on primary system 102. In some embodiments, a view of the file system data corresponding to the backup snapshot is generated for one of the one or more virtual machines 103, i.e., a single virtual machine hosted by primary system 102 is backed up. In some embodiments, a view of the file system data corresponding to the backup snapshot is generated for some of the one or more virtual machines 103.

Storage system 112 may include a file system manager 117 that is configured to organize the file system data of the backup snapshot using a tree data structure. The tree data structures generated by file system manager 117 may be stored in metadata store 114. An example of the tree data structure is a file system metadata snapshot tree, which may be based on a B+tree structure (or other type of tree structure in other embodiments). In the event the backup snapshot corresponds to all of the file system data of primary system 102, the view corresponding to the backup snapshot may be comprised of a file system metadata snapshot tree and one or more file metadata structures. The file system metadata snapshot tree may be configured to store the metadata associated with primary system 102. A file metadata structure may be configured to store the metadata associated with one of the one or more virtual machines 103. Each of the one or more virtual machines 103 may have a corresponding metadata structure.

In the event the backup snapshot corresponds to the file system data of one of the one or more virtual machines, the view corresponding to the backup snapshot may be comprised of a file system metadata snapshot tree and one or more virtual machine file metadata structures. The file system metadata snapshot tree may be configured to store the metadata associated with one of the one or more virtual machines 103. A virtual machine file metadata structure may be configured to store the metadata associated with a file included in the virtual machine.

The tree data structure may be used to capture different views of data. A view of data may correspond to a full backup snapshot, an incremental backup snapshot, a clone of data, a file, etc. The tree data structure allows a chain of file system metadata snapshot trees to be linked together (e.g., "a file system metadata snapshot forest") by allowing a node of a later version of a file system metadata snapshot tree to reference a node of a previous version of a file system metadata snapshot tree. For example, a root node or an intermediate node of a file system metadata snapshot tree corresponding to a second backup snapshot may reference an intermediate node or leaf node of a file system metadata snapshot tree corresponding to a first backup snapshot.

A file system metadata snapshot tree is a representation of a fully hydrated restoration point because it provides a complete view of primary system 102 and/or a virtual machine 103 at a particular moment in time. A fully hydrated restoration point is a restoration point that is ready for use without having to reconstruct by applying a plurality of incremental backups to a full backup to use it. Instead of reconstructing a restoration point by starting with a full backup and applying one or more data changes associated with one or more incremental backups to the data associated with the full backup, storage system 112 maintains fully hydrated restoration points. Any file associated with primary system 102 or a virtual machine at a particular time, for which there is an associated reference restoration point, may be determined from the file system metadata snapshot tree, regardless if the associated reference restoration was a full reference restoration point or an intermediate reference restoration point.

A file system metadata snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data (e.g., data associated with a content file that is less than or equal to a limit size such as 256 kB), an identifier of a data brick, a pointer to a data chunk stored on the storage system, a pointer to another leaf node, inode metadata, etc. In some embodiments, the leaf node stores a pointer to a file metadata structure.

A file metadata structure is configured to store metadata associated with a content file (e.g., virtual machine disk image file) that allows the data associated the content file to be located. A file metadata structure may include a root node, one or more levels of one or more intermediate nodes associated with the root node, and one or more leaf nodes associated with an intermediate node of the lowest intermediate level. Similar to the file system metadata snapshot tree, the file metadata structure allows a chain of file metadata structures corresponding to different versions of a file to be linked together by allowing a node of a later version of a file metadata structure to reference a node of a previous version of a file metadata structure.

A leaf node of a file metadata structure may store a value, such as an identifier of a data brick associated with one or more data chunks. The location of the one or more data chunks associated with a data brick may be identified using one or more data structures (e.g., list, table, etc.) stored in metadata store 114. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Storage system 112 may store a plurality of virtual machine disk image file backups (e.g., hundreds, thousands, etc.). Some of the plurality of virtual machine disk image file backups may be used to restore virtual machines to a system providing a production environment, such as primary system 102. However, a virtual machine disk image file backup may need to undergo one or more changes before it is ready to be deployed to the production environment. For example, the virtual machine associated with a virtual machine disk image file backup may be vulnerable to one or more security risks and one or more security patches may need to be applied to the virtual machine before the virtual machine can be deployed to the production environment. Network settings associated with the virtual machine may have changed and need to be updated before the virtual machine is ready to be used in the production environment. A particular user may have had access to the virtual machine before the virtual machine was backed up, but lost permissions to the virtual machine after the virtual machine was backed up. For compliance reasons, the data associated with the particular user may need to be changed or removed from the virtual machine before the virtual machine is used in the production environment.

As discussed above, other systems may perform such updates after the virtual machine is restored and started. However, applying updates in such a manner may cause significant delays in the time-to-production. Storage system 112 is configured to apply the updates (e.g., security patches, configuration changes, changes for compliance reasons) to a virtual machine disk image file backup before a request to restore a virtual machine is received. This may reduce the time-to-production because when a virtual machine is requested to be restored, the virtual machine may have already updated with the latest updates. Thus, after a virtual machine is restored to a primary system providing a production environment, the virtual machine may be ready for use.

Storage system 112 may store a plurality of virtual machine disk image file backups. Updating a virtual machine disk image file backup may require a certain amount of time. It may not be practical or necessary to update all of the virtual machine disk image file backups. Storage system 112 may select to update a virtual machine disk image file backup among a plurality of virtual machine disk image file backups based on a backup update policy. In some embodiments, a backup update policy may indicate that a latest version of a virtual machine is to be updated. In some embodiments, a backup update policy may indicate that a version of a virtual machine that lacks one or more critical security patches is to be updated. In some embodiments, a backup update policy may indicate that a base virtual machine that is part of a chain of linked cloned virtual machines is to be updated. In some embodiments, a backup update policy may indicate that a version of a virtual machine storing sensitive data (e.g., ex-employee data) is to be updated. In some embodiments, a backup update policy may indicate that a newly added virtual machine disk image file backup is given priority of older virtual machine disk image file backups.

Storage system 112 may clone a backup view that corresponds to the selected virtual machine disk image file backup. The backup view that corresponds to the selected virtual machine disk image file backup is configured to store the metadata that enables the data associated with the selected virtual machine disk image file backup to be located.

In some embodiments, the selected virtual machine disk image file backup corresponds to a file system metadata snapshot tree. For example, primary system 102 may include a plurality of virtual machines and one or more of the virtual machines may be individually backed up to storage system 112. In this case, a separate file system metadata snapshot tree generated by storage system 112 may correspond to each of the individually backed up virtual machines.

In some embodiments, the selected virtual machine disk image file backup corresponds to a file metadata structure. For example, primary system 102 may host a plurality of virtual machines and the entire contents of primary system 102 may be backed up. In this case, storage system 112 may generate a corresponding file metadata structure for each of the backed up virtual machines.

Storage system 112 may clone the backup view that corresponds to the selected virtual machine disk image file backup by copying a root node of the backup view. In some embodiments, a root node of a file system metadata snapshot tree is cloned. In some embodiments, a root node of a file metadata structure is cloned. The root node of the backup view includes a plurality of pointers to a plurality of intermediate nodes. The root node of the cloned backup view initially includes the same plurality of pointers to the same plurality of intermediate nodes. The backup view that corresponds to the selected virtual machine disk image file backup is cloned because the data associated with the backup view that corresponds to the selected virtual machine disk image file backup is immutable. The cloned backup view may be modified to reflect the one or more updates that are applied to the selected virtual machine disk image file backup.

Virtual machine disk mounter 116 may mount a version of the selected virtual machine disk image file backup (e.g., the cloned backup view that corresponds to the selected virtual machine disk image file backup) to apply one or more updates to the virtual machine disk image file backup. A change root operation (e.g., chroot operation) or equivalent may be performed to change the apparent root of a file system namespace to be the root of the virtual machine associated with the selected virtual machine disk image file backup. The files and directories of the virtual machine may be accessible after virtual machine disk mounter 116 performs the change root operation.

Virtual machine update manager 118 may access update repository 122 to determine one or more updates to apply to a version of a virtual machine corresponding to the mounted virtual machine disk image file backup.

Update repository 122 may store one or more updates. An update may comprise a software package. An update may be a script (e.g., shell script) that when executed by virtual machine update manager 118, causes a mounted virtual machine disk image file backup to be updated. In some embodiments, an update may correspond to an update binary. In some embodiments, an update may correspond to a software patch. In some embodiments, an update may change a configuration file of a virtual machine. In some embodiments, an update may delete some of the data from the virtual machine.

A user associated with primary system 102 may select the one or more updates that are to be stored in update repository 122. For example, a virtual machine may be running a particular operating system. The particular operating system may have one or more security vulnerabilities. The particular operating system of the virtual machine may be patched over time to fix the one or more security vulnerabilities. Depending on when a backup of the virtual machine was performed, a virtual machine disk image file backup associated with the virtual machine may or may not have been patched. The user associated with primary system 102 may store in update repository 122 one or more security patches to address the one or more security vulnerabilities for the one or more virtual machine disk image file backups that still have the one or more security vulnerabilities.

A version of a virtual machine is determined. For example, the version of the virtual machine may correspond to an operating system of the virtual machine. The version of the virtual machine may correspond to one of the virtual machines included in a chain of linked cloned virtual machines. The version of the virtual machine may correspond to a backup date associated with the virtual machine backup.

In some embodiments, virtual machine update manager 118 selects some of the one or more updates that are stored in update repository 122. For example, update repository 122 may store all updates that may need to be applied to any of the virtual machine disk image file backups stored by storage system 112. Update repository 122 may store one or more updates that are to be applied to the determined version of the virtual machine. The update repository may store one or more updates that are to be applied to a different version of the virtual machine. Virtual machine update manager 118 may select the one or more updates that are relevant for the version of the virtual machine corresponding to the selected virtual machine disk image file backup. An update may have an associated score that indicates a level of criticality. Virtual machine update manager 118 may select an update that has a score above a criticality threshold. In some embodiments, virtual machine update manager 118 selects all of the one or more updates that are stored in update repository 122.

Virtual machine update manager 118 may apply the one or more selected updates to the mounted virtual machine disk image file backup. Virtual machine update manager 118 may determine an order in which the one or more updates are to be applied to the mounted virtual machine disk image file backup based on one or more backup update policies. A backup update policy may indicate that an update to fix a critical security vulnerability is to be applied before an update to change a configuration of the virtual machine. Virtual machine update manager 118 may be programmatically configured to automatically determine the order in which the one or more updates are to be applied to the mounted virtual machine disk image file backup. A user may specify an order in which a plurality of updates are to be applied.

File system manager 117 may modify the cloned backup view to reflect the changes to the virtual machine disk image file backup so that the data associated with the updated virtual machine disk image file backup may be located when the updated virtual machine disk image file backup is to be restored, replicated, or migrated.

Storage system 112 is configured to store the updated version of the virtual machine disk image file backup and the original version of the virtual machine disk image file backup. In response to a request to restore a virtual machine from a requesting system, storage system 112 may provide the requesting system an option to restore a family of virtual machines that include one or more updated versions of the virtual machine disk image file backup and the original version of the virtual machine disk image file backup. In response to a selection, storage system 112 is configured to restore the selected version to the requesting system. In the event the updated version of the virtual machine disk image file backup is selected, the virtual machine corresponding to the updated version of the virtual machine disk image file backup is ready to be used after being restored to the requesting system.

Figure 2A:
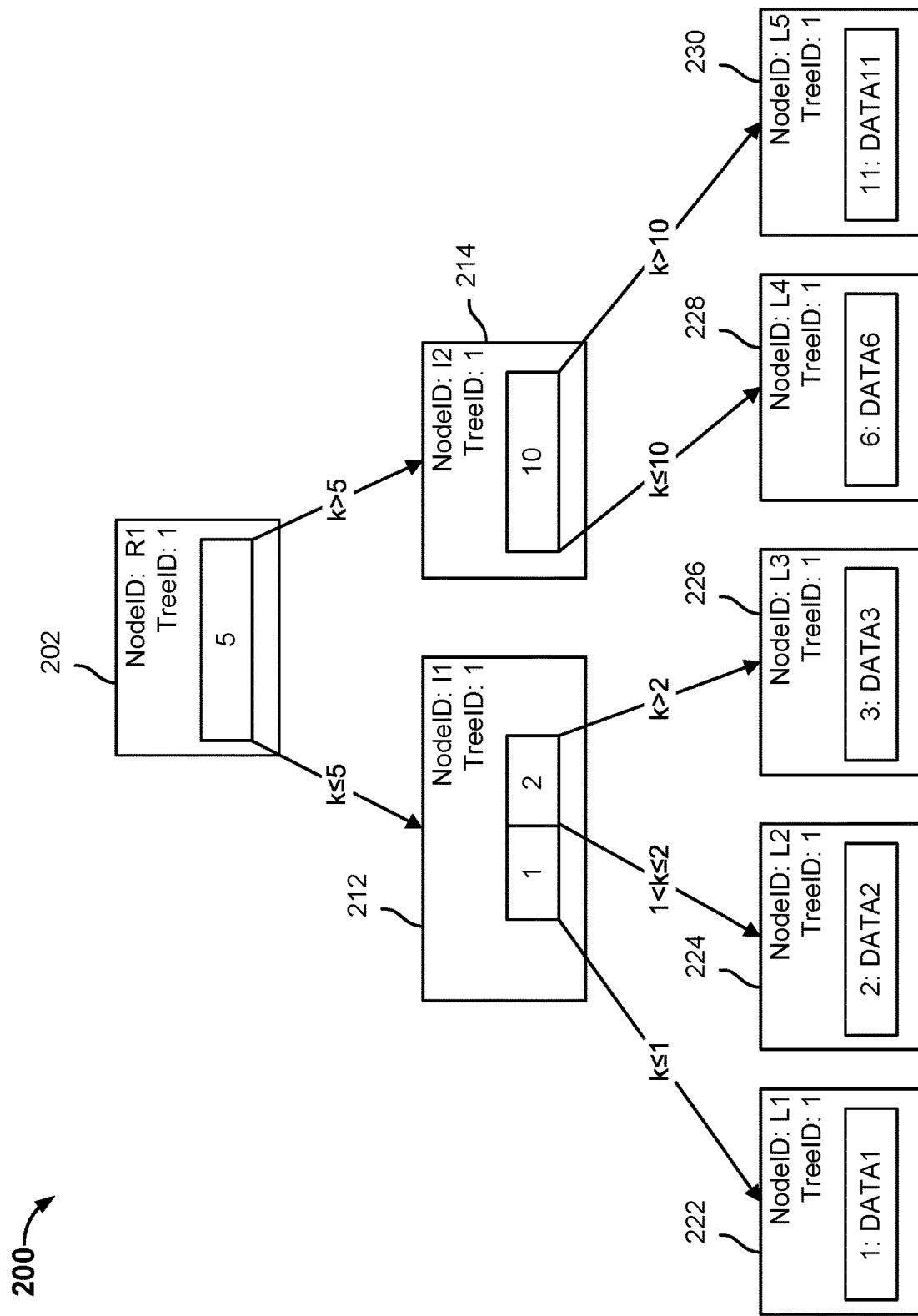
FIG. 2A is a block diagram illustrating an embodiment of a tree data structure.

FIG. 2A is a block diagram illustrating an embodiment of a tree data structure. A tree data structure may be used to represent a view of file system data that is stored on a storage system, such as storage system 112. A file system manager, such as file system manager 117, may generate tree data structure 200. Tree data structure 200 may correspond to a full backup snapshot. In some embodiments, tree data structure 200 corresponds to a virtual machine disk image backup.

Tree data structure 200 is comprised of a file system metadata snapshot tree that includes root node 202, intermediate nodes 212, 214, and leaf nodes 222, 224, 226, 228, 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time, for example, at time $t_0$. The backup snapshot may be received from a primary system, such as primary system 102. The file system metadata snapshot tree in conjunction with a plurality of metadata structures may provide a complete view of the primary system associated with the backup snapshot for the particular point in time. In some embodiments, the file system metadata snapshot tree in conjunction with a plurality of metadata structures may provide a complete view of the virtual machine hosted on a primary system for the particular point in time.

A root node is the starting point of a file system metadata snapshot tree and may include pointers to one or more other nodes. An intermediate node is a node to which another node points (e.g., root node, other intermediate node) and includes one or more pointers to one or more other nodes. A leaf node is a node of the file system metadata snapshot tree at the lowest level of the file system metadata snapshot tree. Each node of the tree structure includes a view identifier of a view with which the node is associated (e.g., TreeID). A leaf node may be configured to store key-value pairs of file system data. A data key k is a lookup value by which a particular leaf node may be accessed. For example, "1" is a data key that may be used to lookup "DATA1" of leaf node 222.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2,", and "3" are less than or equal to the node key "5." To find a leaf node storing a value associated with a data key of "6" or "11," the second branch of root node 202 would be traversed to intermediate node 214 because data keys "6" and "11" are greater than the node key of "5."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key and may be used to determine which branch of a node is associated with a non-numerical data key. For example, a hash function may be applied to a non-numerical data key, resulting in a corresponding hash value; the hash value may be used to select which branch of a node is associated with the corresponding non-numerical data key. Accordingly, it can be determined that a first bucket is associated with a first branch of a node and a second bucket is associated with a second branch of the node.

In the example shown, root node 202 includes pointers to intermediate nodes 212, 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "6" or "11" may be found by traversing tree data structure 200 from root node 202 to intermediate node 214 because the data keys have a value that is greater than the node key.

Intermediate node 212 includes pointers to leaf nodes 222, 224, 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes pointers to leaf nodes 228, 230. Intermediate node 212 includes a NodeID of "I2" and a TreeID of "1." Intermediate node 214 includes a node key of "10." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "6." The pointer to leaf node 230 indicates that traversing tree data structure 200 from intermediate node 214 to leaf node 230 will lead to the node with a data key of "11."

Leaf nodes 222, 224, 226, 228, 230 respectively store the data key-value pairs of "1: DATA1," "2:DATA2," "3:DATA3," "6:DATA6," and "11:DATA11." Leaf nodes 222, 224, 226, 228, 230 respectively have NodeIDs of "L1," "L2," "L3," "L4," and "L5." Each of the leaf nodes 222, 224, 226, 228, 230 have TreeIDs of "1." Leaf nodes 222, 224, 226, 228, 230 may store metadata, content file data when the size of the content file is less than or equal to a limit size, or a pointer to or an identifier of a file metadata structure. A file metadata structure may correspond to a virtual machine disk image file backup.

Figure 2B:
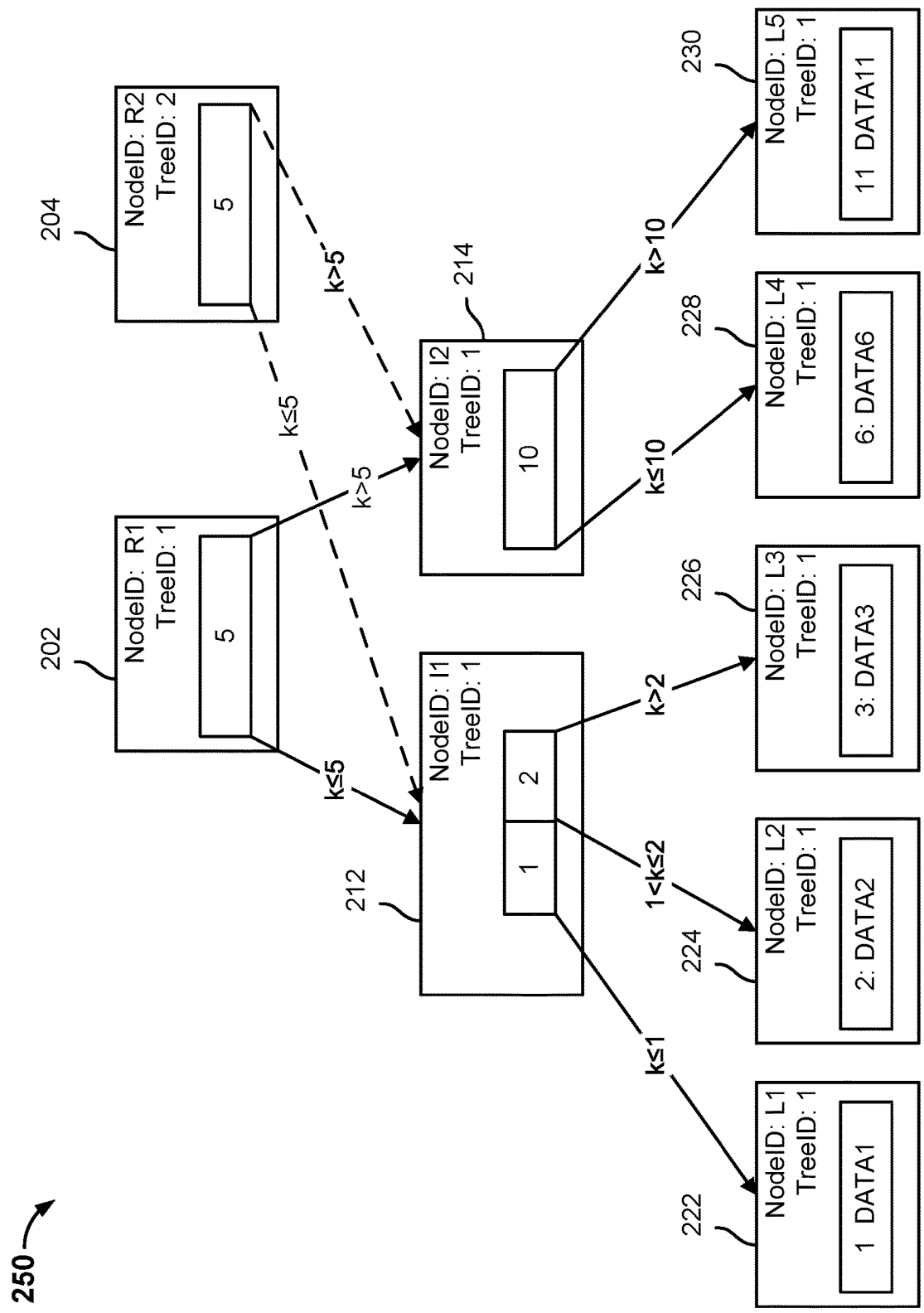
FIG. 2B is a block diagram illustrating an embodiment of a cloned file system metadata snapshot tree.

FIG. 2B is a block diagram illustrating an embodiment of a cloned file system metadata snapshot tree. A file system metadata snapshot tree may be cloned when a file system metadata snapshot tree is added to a tree data structure (e.g., when an incremental backup snapshot is performed), when data associated with a file system metadata snapshot tree is migrated, when data associated with a file system metadata snapshot tree is restored, when data associated with a file system metadata snapshot tree is replicated, when data associated with a file system metadata snapshot tree is used for test/development purposes, when data associated with a file system metadata snapshot tree is to be updated, etc. In some embodiments, tree data structure 250 may be created by a storage system, such as storage system 112. The file system data of a primary system, such as primary system 102, may be backed up to a storage system, such as storage system 112. A subsequent backup snapshot may correspond to an incremental backup snapshot. The tree data structure corresponding to the subsequent backup snapshot is generated in part by cloning a file system metadata snapshot tree associated with a previous backup snapshot.

In some embodiments, the file system metadata snapshot tree corresponds to a virtual machine disk image file backup. One or more updates may be applied to the virtual machine disk image file backup by cloning the file system metadata snapshot tree that corresponds to the virtual machine disk image file backup.

In the example shown, tree data structure 250 includes root nodes 202, 204, intermediate nodes 212, 214, and leaf nodes 222, 224, 226, 228, and 230. Tree data structure 250 can be used to capture different versions of file system data at different moments in time. A tree data structure may also efficiently locate desired metadata by traversing a particular version of a snapshot tree included in the tree data structure.

In some embodiments, the tree data structure allows a chain of backup snapshot versions (i.e., file system metadata snapshot forest) to be linked together by allowing a node of a later version of a file system metadata snapshot tree to reference a node of a previous version of a file system metadata snapshot tree. For example, a file system metadata snapshot tree with root node 204 is linked to a file system metadata snapshot tree with root node 202. Each time a backup snapshot is performed, a new root node may be created and the new root node includes the same set of pointers included in the previous root node, that is the new root node of the snapshot may be linked to one or more intermediate nodes associated with a previous snapshot. The new root node also includes a different NodeID and a different TreeID.

In some embodiments, a root node is associated with a snapshot view of the file system data. A snapshot view may represent a state of the file system data at a particular moment in time in the past and is not updated. In the example shown, root node 202 is associated with a snapshot view of the file system data. In some embodiments, the snapshot view of file system data is associated with a virtual machine disk image file backup. In some embodiments, a root node is associated with a current view of the file system data. A current view may still accept one or more changes to the data. In the example shown, root node 204 is associated with a current view of the file system data. In some embodiments, the current view of file system data is associated with an updated version of the virtual machine disk image file backup.

To generate a file system metadata snapshot tree corresponding to an incremental backup snapshot at ti, root node 202 is cloned, i.e., copied. In the example shown, root node 204 is a copy of root node 202. Similar to root node 202, root node 204 includes the same pointers as root node 202, but includes a different NodeID and a different TreeID. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "6" or "11." Root node 204 includes a NodeID of "R2" and a TreeID of "2."

Figure 2C:
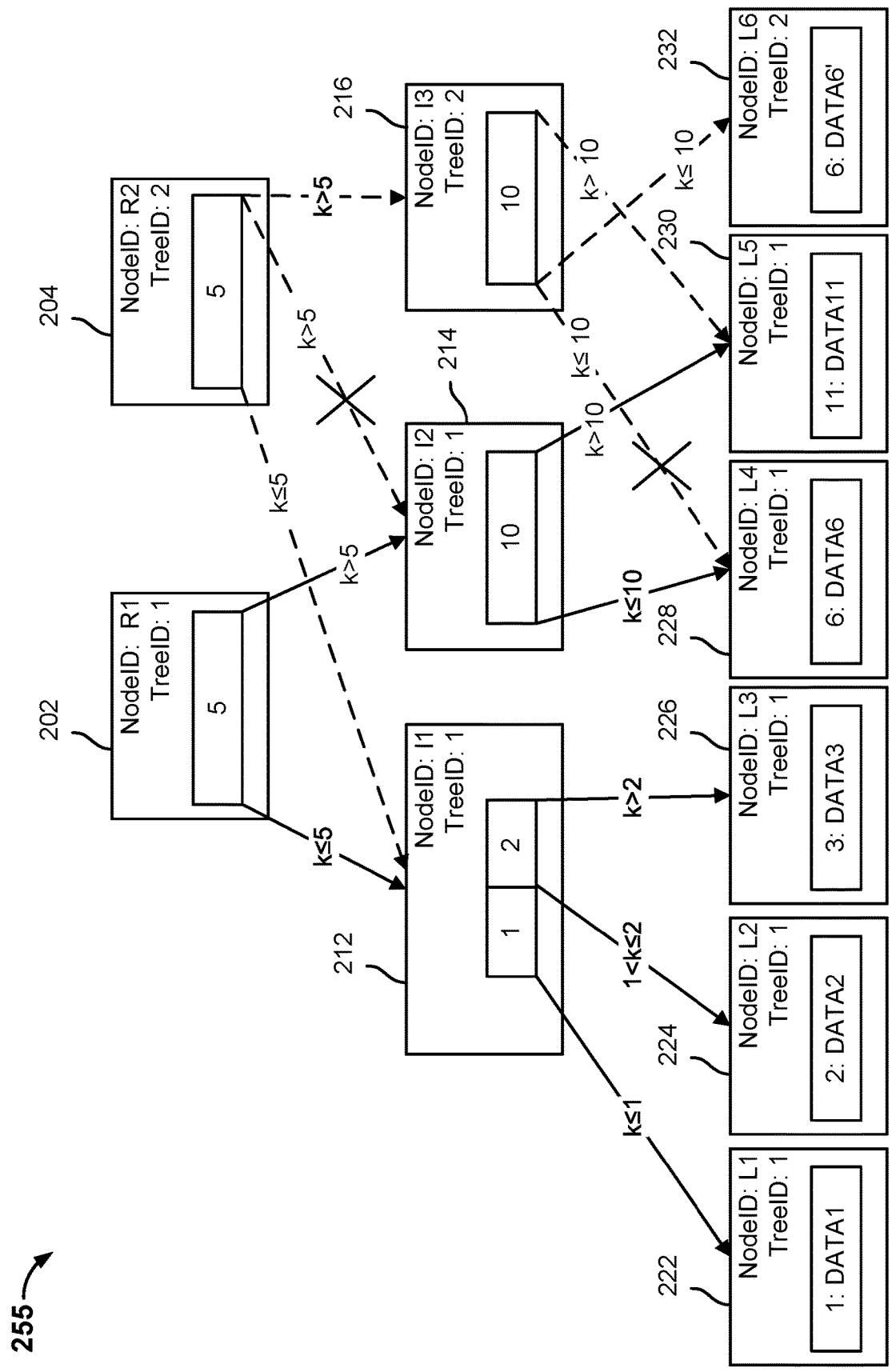
FIG. 2C is a block diagram illustrating an embodiment of modifying a cloned file system metadata snapshot tree.

FIG. 2C is a block diagram illustrating an embodiment of modifying a cloned file system metadata snapshot tree. In the example shown, tree data structure 255 may be modified by a file system manager, such as file system manager 117. A file system metadata snapshot tree with a root node 204 may be a current view of the file system data, for example, at time $t_1$. A cloned file system metadata snapshot tree may be updated to reflect the changes made to a mounted version of a virtual machine disk image file backup.

In the example shown, the value "DAT A6" has been modified to be "DATA6'." In some embodiments, the value of a key value pair has been modified. In other embodiments, the value of the key value pair points to a different file metadata structure (e.g., a file metadata structure corresponding to a different version of a file). The different file metadata structure may be a modified version of the file metadata structure to which the leaf node previously pointed.

To modify the file system metadata snapshot tree at $t_1$, the file system manager starts at root node 204 because that is the root node associated with the file system metadata snapshot tree at time $t_1$. The value "DATA6" is associated with the data key "6." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made.

A shadow copy of a node is performed when the node is included in a plurality of file system metadata snapshot trees (e.g., the file system metadata snapshot tree with root node 202 and the file system metadata snapshot tree with root node 204) and a value stored by the node has been updated. The value stored by a node that is associated with a file system metadata snapshot tree that corresponds to a previous backup snapshot is immutable. The shadow copy of the node enables a value stored by a node to be updated because the shadow copy of the node is not shared with one or more file system metadata snapshot trees that correspond to one or more previous backup snapshots, rather, the shadow copy of the node is associated with the cloned file system metadata snapshot tree.

A shadow copy is a copy of a node and includes the same pointers as the copied node, but includes a different NodeID and TreeID. For example, to reach a leaf node with a data key of "6," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228, i.e., a shadow copy. Leaf node copy 232 stores the modified value "DATA6'" and includes the same TreeID as root node 204. The file system manager updates a pointer of intermediate node 216 to point to leaf node 232 instead of pointing to leaf node 228. In some embodiments, leaf node 232 stores the value of a key value pair that has been modified. In some embodiments, leaf node 232 stores the modified data associated with a content file that is smaller than or equal to a limit size. In some embodiments, leaf node 232 stores a pointer to a different file metadata structure.

Figure 2D:
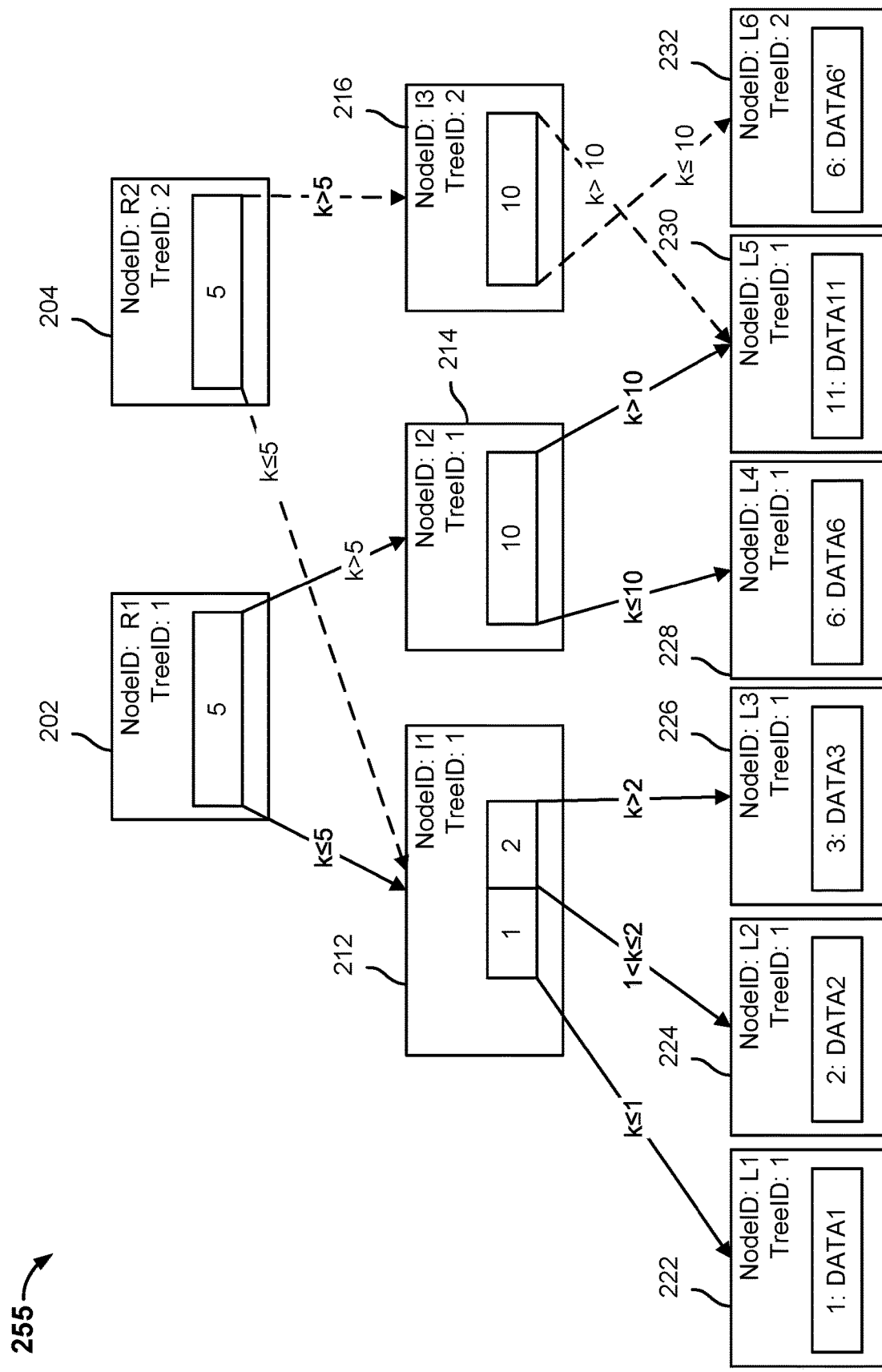
FIG. 2D is a block diagram illustrating an embodiment of a modified file system metadata snapshot tree.

FIG. 2D is a block diagram illustrating an embodiment of a modified file system metadata snapshot tree. Tree data structure 255 shown in FIG. 2D illustrates a result of the modifications made to a file system metadata snapshot tree as described with respect to FIG. 2C.

Figure 3A:
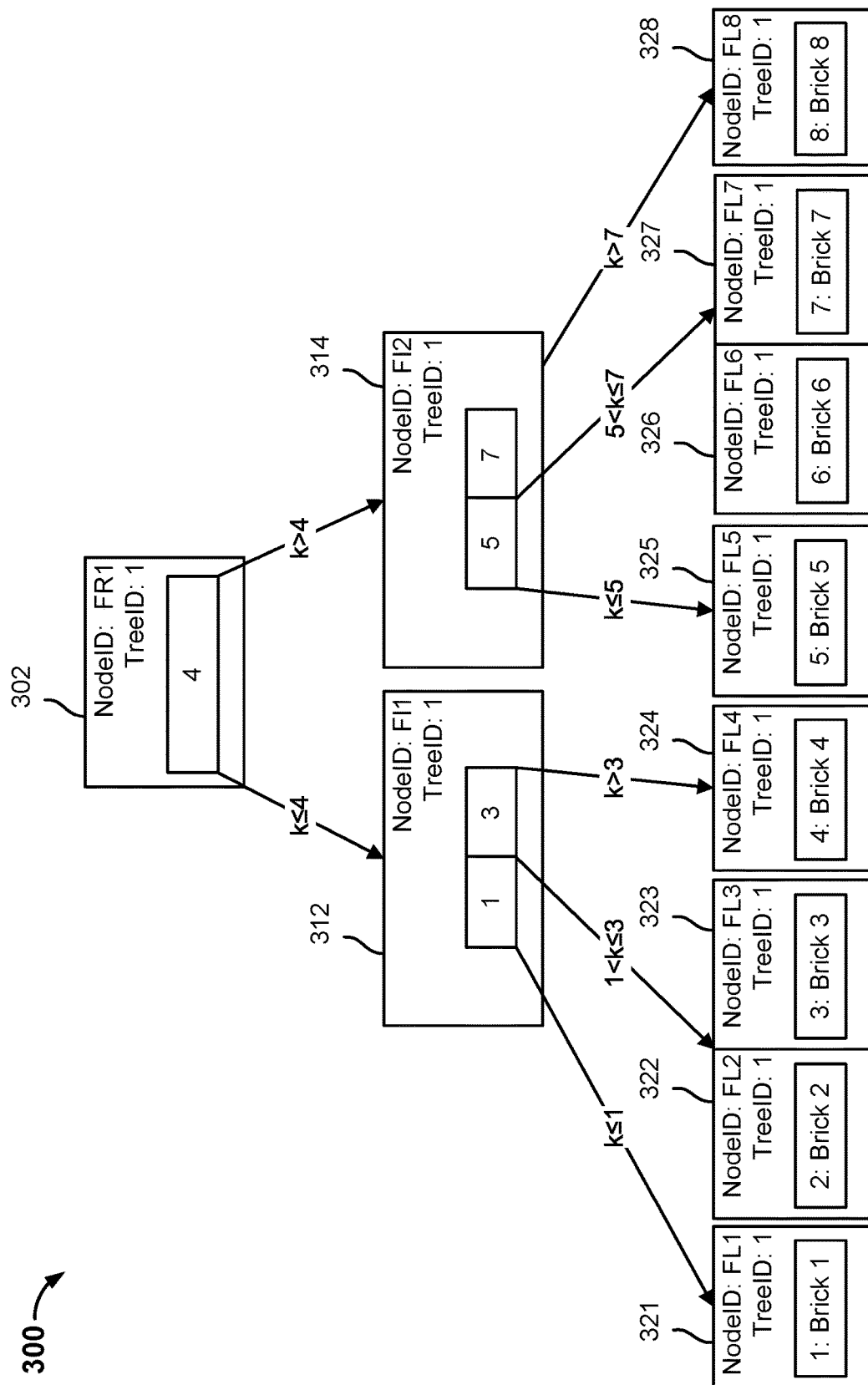
FIG. 3A is a block diagram illustrating an embodiment of a tree data structure.

FIG. 3A is a block diagram illustrating an embodiment of a tree data structure. In some embodiments, tree data structure 300 may be created by a storage system, such as storage system 112. Tree data structure 300 may be used to store metadata associated with a file metadata structure, which may be used to locate the data associated with a content file.

In the example shown, tree data structure 300 corresponds to a content file, such as a virtual machine disk image file backup, and stores the file metadata associated with the content file. The file metadata associated with a content file may be stored by a storage system separate from the contents of the file, that is, tree data structure storing the file metadata associated with a content file is stored separately from the contents of the content file. For example, the contents of the file may be stored on a hard disk drive, while tree data structure 300 that holds the file metadata may be stored in storage with faster access times, such as a solid state drive (SSD) of a storage node.

A leaf node of a file system metadata snapshot tree associated with file system data, such as a leaf node of tree data structures 200, 250, 255, may include a pointer to a tree data structure that stores metadata corresponding to a content file, such as tree data structure 300. A tree data structure corresponding to a content file and storing the file metadata associated with the content file is a snapshot tree, but is used to organize the data chunks associated with a content file (e.g., data components) that are stored on the storage system. A file metadata structure may be referred to as a file metadata tree.

A tree data structure corresponding to a content file at a particular point in time (e.g., a particular version) may be comprised of a root node, one or more levels of one or more intermediate nodes, and one or more leaf nodes. Tree data structure 300 may be a snapshot of a content file at a particular point in time t, for example at time $t_0$. Tree data structure 300 may correspond to a full backup of a content file, such as a full backup of a virtual machine disk image file.

In the example shown, tree data structure 300 includes file root node 302, file intermediate nodes 312, 314, and file leaf nodes 321, 322, 323, 324, 325, 326, 327, 328. Similar to the snapshot trees described above, each node includes a "NodeID" that identifies the node and a "TreeID" that identifies a view with which the node is associated (e.g., a version of the content file). Root node 302 includes pointers to intermediate nodes 312, 314. Root node 302 includes a NodeID of "FR1" and a TreeID of "1."

In the example shown, intermediate node 312 includes respective pointers to leaf nodes 321, 322, 323, 324. Intermediate node 312 includes a NodeID of "FI1" and a TreeID of "1." Intermediate node 312 includes a first node key and a second node key. The data key k for leaf node 321 is a value that is less than or equal to the first node key. The data key for leaf nodes 322, 323 is a value that is greater than the first node key and less than or equal to the second node key. The data key for leaf node 324 is a value that is greater than the second node key. The pointer to leaf node 321 indicates that traversing tree data structure 300 from intermediate node 312 to leaf node 321 will lead to the node with a data key of "1." The pointer to leaf node 322 indicates that traversing tree data structure 300 from intermediate node 312 to leaf node 322 will lead to the node with a data key of "2." The pointer to leaf node 323 indicates that traversing tree data structure 300 from intermediate node 312 to leaf node 323 will lead to the node with a data key of "3." The pointer to leaf node 324 indicates that traversing tree data structure 300 from intermediate node 312 to leaf node 324 will lead to the node with a data key of "4."

In the example shown, intermediate node 314 includes respective pointers to leaf nodes 325, 326, 327, 328. Intermediate node 314 includes a NodeID of "FI2" and a TreeID of "1." Intermediate node 314 includes a first node key and a second node key. The data key k for leaf node 325 is a value that is less than or equal to the first node key. The data key for leaf nodes 326, 327 is a value that is greater than the first node key and less than or equal to the second node key. The data key for leaf node 328 is a value that is greater than the second node key. The pointer to leaf node 325 indicates that traversing tree data structure 300 from intermediate node 314 to leaf node 325 will lead to the node with a data key of "5." The pointer to leaf node 326 indicates that traversing tree data structure 300 from intermediate node 314 to leaf node 326 will lead to the node with a data key of "6." The pointer to leaf node 327 indicates that traversing tree data structure 300 from intermediate node 314 to leaf node 327 will lead to the node with a data key of "7." The pointer to leaf node 328 indicates that traversing tree data structure 300 from intermediate node 314 to leaf node 328 will lead to the node with a data key of "8."

Leaf node 321 includes a data key-value pair of "1: Brick 1." "Brick 1" is a brick identifier that identifies the data brick associated with one or more data chunks of a content file corresponding to tree data structure 300. Leaf node 321 includes NodeID of "FL1" and a TreeID of "1."

Leaf node 322 includes a data key-value pair of "2: Brick 2." "Brick 2" is a brick identifier that identifies the data brick associated with one or more data chunks of a content file corresponding to tree data structure 300. Leaf node 322 includes NodeID of "FL2" and a TreeID of "1." In this example, both leaf nodes 322, 323 have a key value that is less than or equal to 3 and greater than 1. A file system manager may traverse to leaf node 322 or leaf node 323 based on the corresponding key associated with leaf node 322 and leaf node 323. For example, the file system manager may receive a request to return the value associated with a data key "2." In response to the request, the file system manager may traverse tree data structure 300 to leaf node 322. A file system manager may receive a request to return the value associated with a data key "3." In response to the request, the file system manager may traverse tree data structure 300 to leaf node 323.

Leaf node 323 includes a data key-value pair of "3: Brick 3." "Brick 3" is a brick identifier that identifies the data brick associated with one or more data chunks of a content file corresponding to tree data structure 300. Leaf node 323 includes NodeID of "FL3" and a TreeID of "1."

Leaf node 324 includes a data key-value pair of "4: Brick 4." "Brick 4" is a brick identifier that identifies the data brick associated with one or more data chunks of a content file corresponding to tree data structure 300. Leaf node 324 includes NodeID of "FL4" and a TreeID of "1."

Leaf node 325 includes a data key-value pair of "5: Brick 5." "Brick 5" is a brick identifier that identifies the data brick associated with one or more data chunks of a content file corresponding to tree data structure 300. Leaf node 325 includes NodeID of "FL5" and a TreeID of "1."

Leaf node 326 includes a data key-value pair of "6: Brick 6." "Brick 6" is a brick identifier that identifies the data brick associated with one or more data chunks of a content file corresponding to tree data structure 300. Leaf node 326 includes NodeID of "FL6" and a TreeID of "1." In this example, both leaf nodes 326, 327 have a key value that is less than or equal to 7 and greater than 5. A file system manager may traverse tree data structure 300 to leaf node 326 or leaf node 327 based on the corresponding key associated with leaf node 326 and leaf node 327. For example, the file system manager may receive a request to return the value associated with a data key "6." In response to the request, the file system manager may traverse tree data structure 300 to leaf node 326. The file system manager may receive a request to return the value associated with a data key "7." In response to the request, the file system manager may traverse tree data structure 300 to leaf node 327.

Leaf node 327 includes a data key-value pair of "7: Brick 7." "Brick 7" is a brick identifier that identifies the data brick associated with one or more data chunks of a content file corresponding to tree data structure 300. Leaf node 327 includes NodeID of "FL7" and a TreeID of "1."

Leaf node 328 includes a data key-value pair of "8: Brick 8." "Brick 8" is a brick identifier that identifies the data brick associated with one or more data chunks of a content file corresponding to tree data structure 300. Leaf node 328 includes NodeID of "FL8" and a TreeID of "1."

A content file may be comprised of a plurality of data chunks. A brick may be associated with one or more data chunks. In the example shown, leaf nodes 321, 322, 323, 324, 325, 326, 327, 328 each store a corresponding brick identifier. A metadata store, such as metadata store 114, may include one or more data structures that associate a brick identifier with one or more corresponding chunk identifiers and a corresponding location (physical location) of the one or more data chunks associated with the one or more corresponding chunk identifiers. For example, a metadata store may store a first data structure (e.g., chunk metadata table) that is configured to associate brick identifiers with chunk identifiers and chunk file identifiers. The metadata store may store a second data structure (e.g., chunk file metadata table) that associates a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Figure 3B:
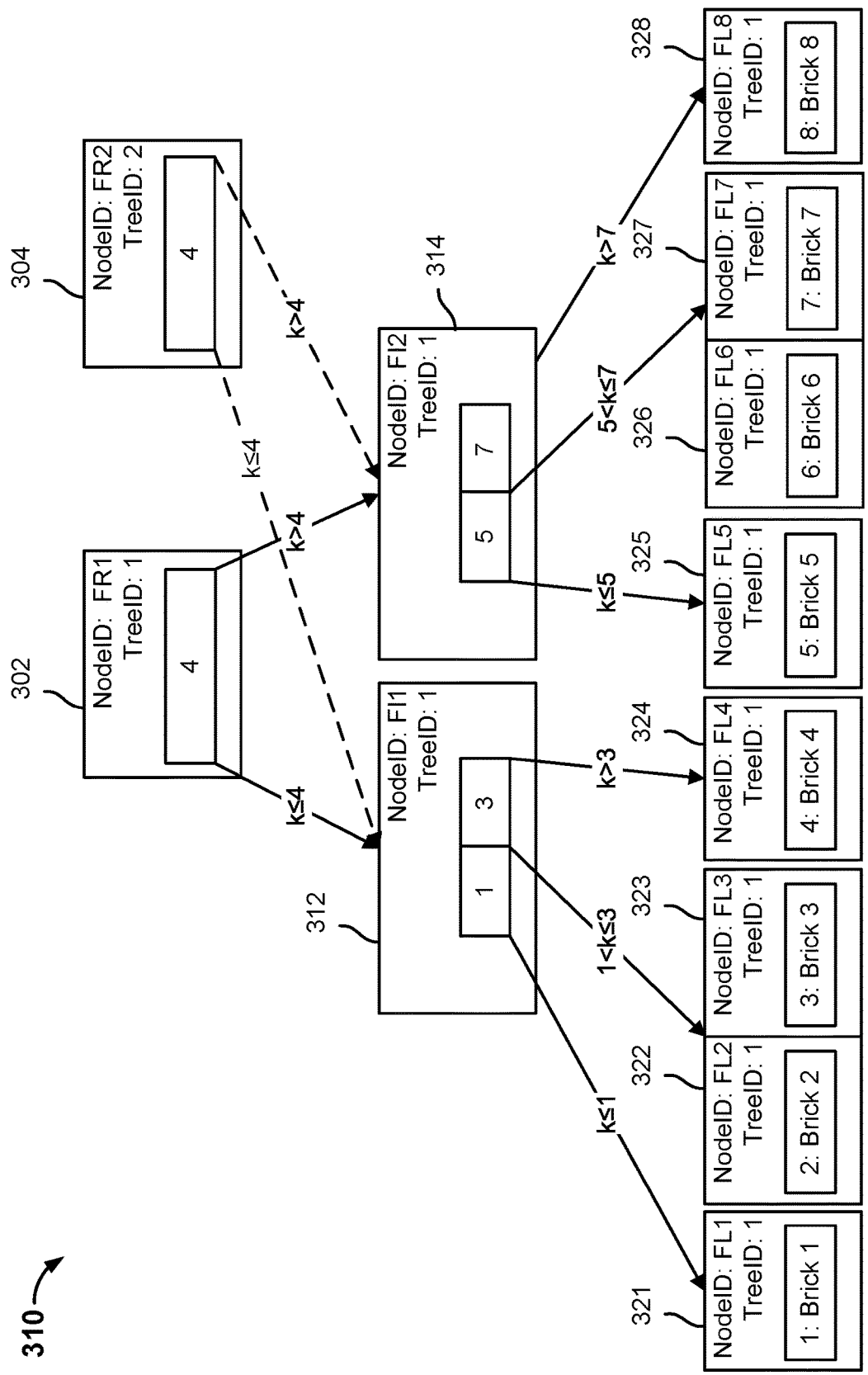
FIG. 3B is a block diagram illustrating an embodiment of a cloned file metadata structure.

FIG. 3B is a block diagram illustrating an embodiment of a cloned file metadata structure. A file metadata structure may be cloned when a subsequent version of a content file is stored on a storage system. A file metadata structure corresponding to a virtual machine disk image file backup may be cloned to apply one or more updates to the virtual machine disk image file backup. In some embodiments, tree data structure 310 may be created by a storage system, such as storage system 112. In the example shown, tree data structure 310 corresponds to a content file that is a snapshot tree, but stores file metadata associated with the content file. The tree data structure corresponding to a content file can be used to capture different versions of a content file at different moments in time. In some embodiments, the tree data structure allows a chain of file metadata structures corresponding to different versions of a content file to be linked together by allowing a node of a later version of a file metadata structure to reference a node of a previous version of a file metadata structure. The file metadata structure corresponding to a subsequent version of a content file may be generated in part by cloning the file metadata structure corresponding to a previous version of a content file.

A root node or an intermediate node of a version of a file metadata structure may reference an intermediate node or a leaf node of a previous version of a file metadata structure. Similar to the file system metadata snapshot tree, the file metadata structure allows different versions of a content file to share nodes and allows changes to a content file to be tracked. When a backup snapshot is received, a root node of the file metadata structure may be linked to one or more intermediate nodes associated with a previous file metadata structure. This may occur when data associated with a content file is included in both backup snapshots.

In the example shown, tree data structure 310 includes a first file metadata structure comprising root node 302, intermediate nodes 312, 314, and leaf nodes 321, 322, 323, 324, 325, 326, 327, 328. Tree data structure 310 also includes a second file metadata structure that may be a snapshot of file data at a particular point in time, for example at time ti. The second file metadata structure is comprised of root node 304, intermediate nodes 312, 314, and leaf nodes 321, 322, 323, 324, 325, 326, 327, 328. In some embodiments, the second file metadata structure corresponds to an updated version of a virtual machine disk image file backup.

To create a snapshot of the file data at time $t_1$, a new root node is created by cloning the previous root node. The cloned root node includes the same set of pointers as the previous root node, but includes a different NodeID and a different TreeID. In the example shown, root node 304 includes a set of pointers to intermediate nodes 312, 314, which are intermediate nodes associated with a previous snapshot. The TreeID is the view identifier associated with a view of the file metadata structure at a particular moment in time. The TreeID of a root node indicates a view with which the root node is associated (e.g., content file version). For example, root node 302 with a TreeID of "1" is associated with a first backup snapshot and root node 304 with a TreeID of "2" is associated with a second backup snapshot.

In the example shown, root node 304 is a clone (i.e., a copy) of root node 302. Similar to root node 302, root node 304 includes the same pointers as root node 302. Root node 304 includes a first set of pointers to intermediate node 312. The first set of pointers associated with a data key (e.g., "1," "2," "3," or "4") less than or equal to the node key indicates that traversing a file metadata structure included in tree data structure 310 from root node 304 to intermediate node 312 leads to a leaf node with a data key of "1," "2," "3," or "4." Root node 304 includes a second set of pointers to intermediate node 314. The second set of pointers associated with a data key greater than the node key indicates that traversing a file metadata structure included in tree data structure 310 from root node 304 to intermediate node 314 leads to a leaf node with a data key of "5," "6," "7," or "8." Root node 304 includes a NodeID of "FR2" and a TreeID of "2."

Figure 3C:
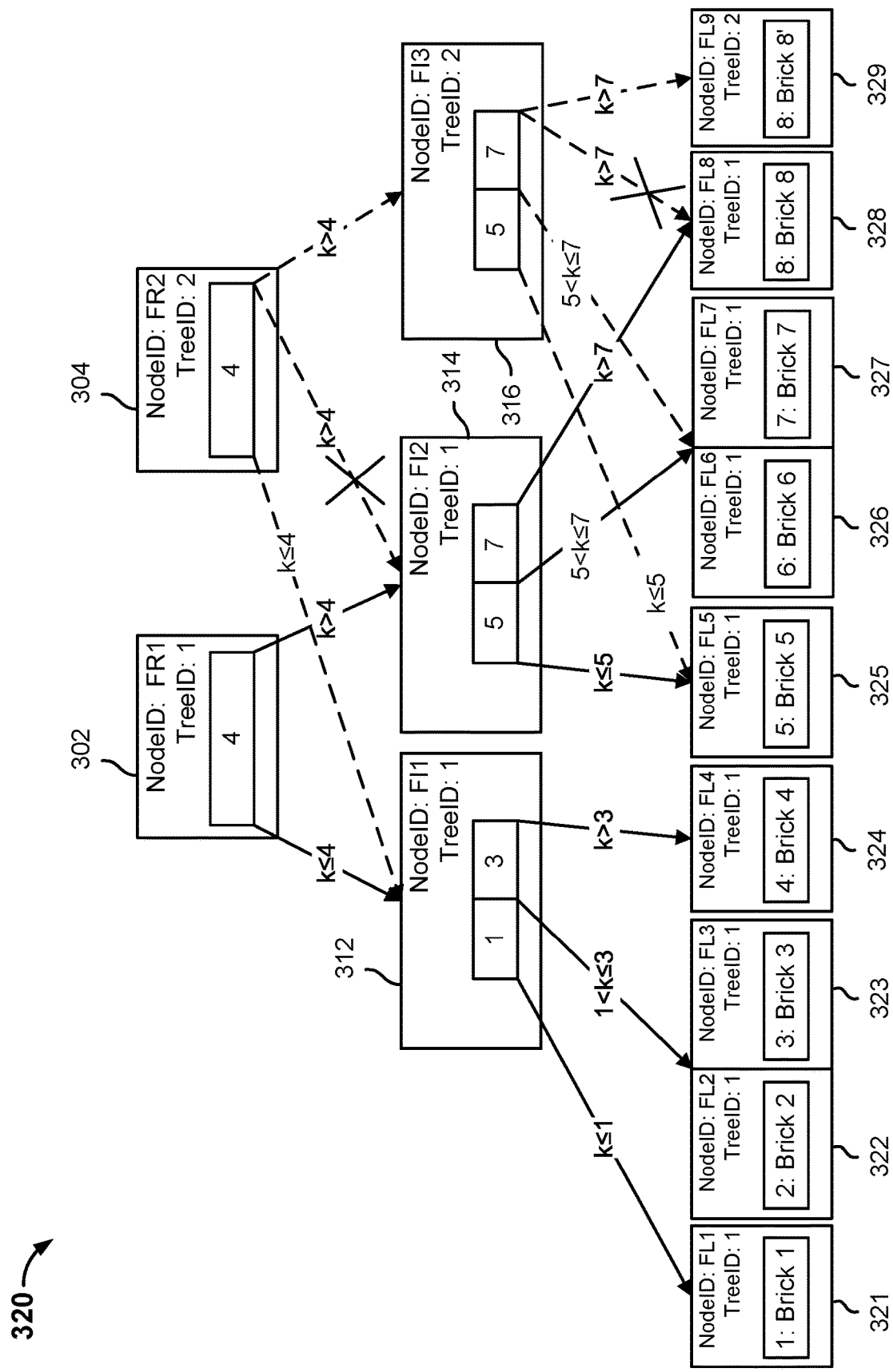
FIG. 3C is a block diagram illustrating an embodiment of modifying a cloned metadata structure.

FIG. 3C is a block diagram illustrating an embodiment of modifying a cloned metadata structure. Tree data structure 320 is comprised of a first metadata structure that includes root node 302 and a second metadata structure that includes root node 304. In the example shown, tree data structure 320 may be modified by a file system manager, such as file system manager 117.

In some embodiments, the file data associated with a content file may be modified such that one of the data chunks is replaced by another data chunk to represent the modification. For example, an update applied to a virtual machine disk image file may change a data chunk of the virtual machine disk image file. When a data chunk of file data associated with a previous backup snapshot is replaced with a new data chunk, the data brick associated with the new data chunk may be different. A leaf node of a metadata structure stores a brick identifier of a data brick that is associated with a data chunk. To represent this modification to the file data, a corresponding modification is made to a current view of a metadata structure. The current view of the metadata structure is modified because the previous metadata structure is a snapshot view and can no longer be modified. The data chunk of the file data that was replaced has a corresponding leaf node in the previous metadata structure. A new leaf node in the current view of the metadata structure is created, as described herein, that corresponds to the new data chunk. The new leaf node includes an identifier associated with the current view. The new leaf node may also store the chunk identifier associated with the modified data chunk.

In the example shown, a data chunk associated with "Brick 8" has been modified. The data chunk associated with "Brick 8" has been replaced with a data chunk associated with "Brick 8'." At $t_1$, the file system manager starts at root node 304 because that is the root node associated with the metadata structure at time $t_1$. The value "Brick 8" is associated with the data key "8." The file system manager traverses tree data structure 320 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "8," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 320 from intermediate node 316 to leaf node 328, determines that the TreeID of leaf node 328 does not match the TreeID of root node 304, and creates a copy of leaf node 328. Leaf node 329 is a copy of leaf node 328, but stores the brick identifier "Brick 8 '" and includes the same TreeID as root node 304. The file system manager updates a pointer of intermediate node 316 to point to leaf node 329 instead of pointing to leaf node 328.

Figure 3D:
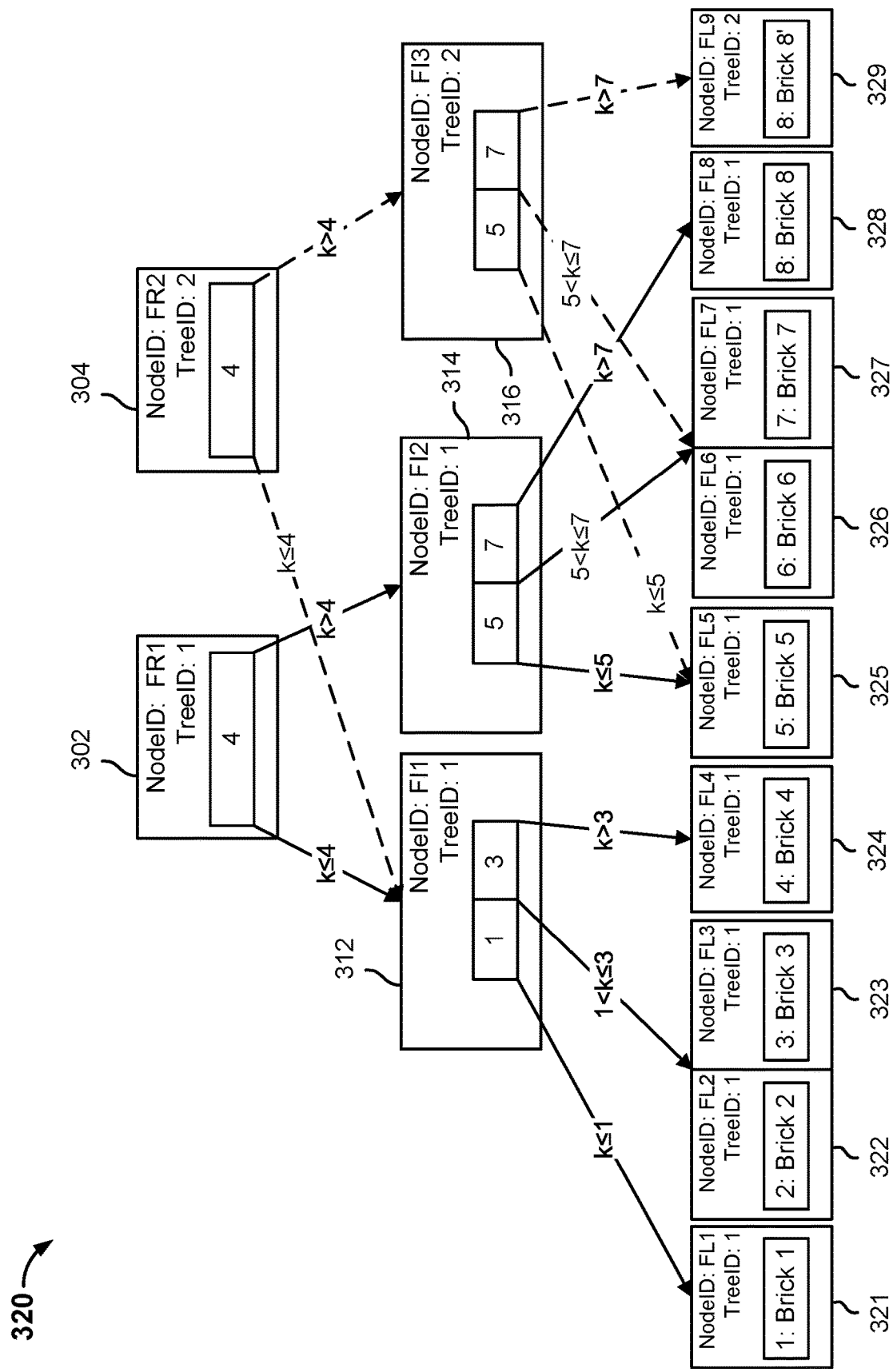
FIG. 3D is a block diagram illustrating an embodiment of a modified metadata structure.

FIG. 3D is a block diagram illustrating an embodiment of a modified metadata structure. The tree data structure 320 shown in FIG. 3D illustrates a result of the modifications made to tree data structure 320 as described with respect to FIG. 3C.

FIG. 4A is a diagram illustrating a data structure in accordance with some embodiments. Data structure 400 may be stored by a storage system, such as storage system 112, in a metadata store, such as metadata store 114. Data structure 400 may correspond to a chunk metadata table. In the example shown, data structure 400 stores the information associated with tree data structure 320. Data structure 400 stores information about the nodes included in tree data structure 320. For example, data structure 400 stores information about a node, such as "TreeID," "NodeID," "ChildrenID," "Ref Count," "Value," "ChunkID," and "Chunk FileID."

The "TreeID" value identifies a view of data to which the node is originally associated. For example, a view of data may be generated by a storage system. A "TreeID" of "1" indicates that a node was generated when the storage system generated a view of data associated with a "TreeID" of "1." The "NodeID" value identifies a name of a node. The "ChildrenID" value identifies the one or more children nodes to which the node points. The "Ref Count" value is a reference count that indicates a number of nodes that point to the node. The "Value" value is a value (e.g., brick identifier) stored by a leaf node. The "ChunkID" value is a chunk identifier associated with a brick identifier. The "Chunk FileID" value is a chunk file identifier that is associated with a chunk identifier.

A storage system may store a version of data structure 400 for each view generated by the storage system. In some embodiments, data structure 400 stores information for all of the views generated by the storage system.

A storage system may traverse data structure 400 to determine which data chunks are associated with a view of data. In the example shown, the storage system may traverse data structure 400 to determine that data chunks having chunk identifiers "SHA-$1_a$," "SHA-$1_b$," "SHA-$1_c$," "SHA-$1_d$," "SHA-$1_e$," "SHA-$1_f$," and "SHA-$1_g$" are associated with views having a "TreeID" of "1" and "2." The storage system may traverse data structure 400 to determine that the data chunk with the chunk identifier "SHA-$1_h$" is associated with view having a "TreeID" of "1." The storage system may traverse data structure 400 to determine that the data chunk with the chunk identifier "SHA-$1_i$" is associated with view having a "TreeID" of "2."

In the example shown, the storage system may traverse data structure 400 to determine that a view with a "TreeID" of "1" is associated with data chunks with the chunk identifiers "SHA-$1_a$," "SHA-$1_b$," "SHA-$1_c$," "SHA-$1_d$," "SHA-$1_e$," "SHA-$1_f$," "SHA-$1_g$," and "SHA-$1_h$." The storage system may traverse data structure 400 to determine that a view with a "TreeID" of "2" is associated with data chunks with the chunk identifiers "SHA-$1_a$," "SHA-$1_b$," "SHA-$1_c$," "SHA-$1_d$," "SHA-$1_e$," "SHA-$1_f$," "SHA-$1_g$," and "SHA-$1_i$."

FIG. 4B is a diagram illustrating a data structure in accordance with some embodiments. Data structure 450 may correspond to a chunk file metadata table. Data structure 450 may be stored in a metadata store, such as metadata store 114. In the example shown, data structure 450 is configured to associate a chunk file identifier with a chunk identifier, a chunk file offset, a storage node, and a primary owner.

A chunk file is comprised of a plurality of data chunks. Data structure 450 may indicate the plurality of data chunks associated with a chunk file. Data structure 450 may also indicate corresponding locations of the data chunks within the chunk file. For example, data structure 450 indicates that a chunk file having a chunk file identifier of "Chunk File 1" is comprised of at least a first data chunk having a chunk identifier of "SHA-$1_a$," a second data chunk having a chunk identifier of "SHA-$1_b$," a third data chunk having a chunk identifier of "SHA-$1_c$," and a fourth data chunk having a chunk identifier of "SHA-$1_d$." The first data chunk has a chunk file offset of "0-256 kb," the second data chunk has a chunk file offset of "256 kb-512 kb," the third data chunk has a chunk file offset of "512 kb-768 kb," and the fourth data chunk has a chunk file offset of "768 kb-1024 kb."

Data structure 450 indicates that a chunk file having a chunk file identifier of "Chunk File 2" is comprised of at least a first data chunk having a chunk identifier of "SHA-$1_e$," a second data chunk having a chunk identifier of "SHA-$1_f$," a third data chunk having a chunk identifier of "SHA-$1_g$," and a fourth data chunk having a chunk identifier of "SHA-$1_h$." The first data chunk has a chunk file offset of "0-256 kb," the second data chunk has a chunk file offset of "256 kb-512 kb," the third data chunk has a chunk file offset of "512 kb-768 kb," and the fourth data chunk has a chunk file offset of "768 kb-1024 kb."

Data structure 450 indicates that a chunk file having a chunk file identifier of "Chunk File 3" is comprised of at least a first data chunk having a chunk identifier of "SHA-$1_i$." The first data chunk has a chunk file offset of "0-256 kb."

A storage system comprised of a plurality of storage nodes may store duplicate copies of a chunk file across the nodes. This may ensure access to the chunk file in the event a storage node of the storage system goes offline. In the example shown, a chunk file having a chunk file identifier of "Chunk File 1" is stored on storage node 1 and storage node 3, a chunk file having a chunk file identifier of "Chunk File 2" is stored on storage node 2 and storage node 4, and a chunk file having a chunk file identifier of "Chunk File 3" is stored on storage node 2 and storage node 3.

A chunk file may be associated with a primary owner. The primary owner may correspond to the original metadata structure that includes references to the data chunks included in the chunk file. For example, a primary system may perform a first backup snapshot that includes a first content file and send the data associated with the first content file to a storage system. The storage system may generate and store the data associated with the first content file in one or more chunk files. The storage system may generate a first metadata structure corresponding to the first content file. In other embodiments, the primary owner corresponds to the original content file that is associated with the chunk file.

The primary system may perform a second backup snapshot that includes a second content file and send the data associated with the second content file to the storage system. Some of the data associated with the second content file may already be stored on the storage system. Instead of generating a second chunk file for the duplicate data, the storage system may generate a second metadata structure corresponding to the second content file and the second metadata structure may include one or more references to the one or more chunk files associated with the first content file. The second file metadata structure may be considered to be a secondary owner. In the example shown, the metadata structure corresponding to "File 1" is the primary owner of chunk files 1, 2 and the metadata structure corresponding to "File 2" is the primary owner of chunk file 3.

A chunk file metadata table may associate portions of a chunk file with one or more secondary owners. For example, file 2 is a secondary owner of chunk file 1 having a file offset of 0-1024 kb and file 2 is a secondary owner of chunk file 2 having a file offset of 0-768 kb.

Figure 5:
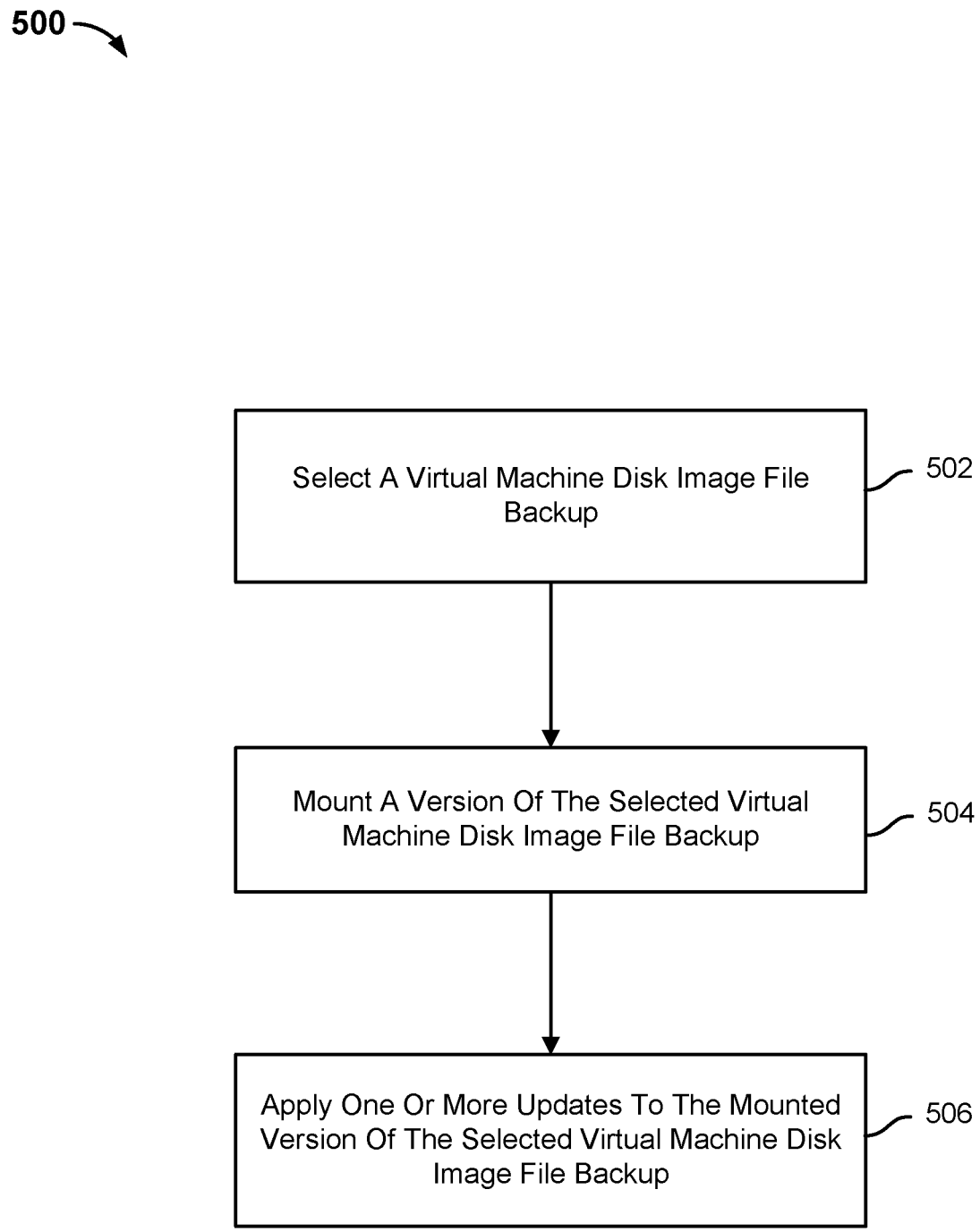
FIG. 5 is a flow chart illustrating a process for updating a virtual machine disk image file backup in accordance with some embodiments.

FIG. 5 is a flow chart illustrating a process for updating a virtual machine disk image file backup in accordance with some embodiments. In the example shown, process 500 may be implemented by a storage system, such as storage system 112.

At 502, a virtual machine disk image file backup is selected. A storage system may store a plurality of virtual machine disk image file backups. Updating a virtual machine disk image file backup may require a certain amount of time. It may not be practical or necessary to update all of the virtual machine disk image file backups.

A virtual machine disk image file backup may be selected among the plurality of virtual machine disk image file backups stored on a backup storage based on a backup update policy. In some embodiments, a backup update policy indicates that a latest version of a virtual machine is to be updated. In some embodiments, a backup update policy indicates that a version of a virtual machine that lacks one or more critical security patches is to be updated. In some embodiments, a backup update policy indicates that a virtual machine having a particular configuration is to be updated. In some embodiments, a backup update policy indicates that a virtual machine disk image file backup storing certain data (e.g., sensitive data) is to be updated. In some embodiments, a backup update policy indicates that a newly added virtual machine disk image file backup is given priority over older virtual machine disk image file backups.

At 504, a version of the selected virtual machine disk image file backup is mounted. The storage system may store a backup view that includes the selected virtual machine disk image file backup. A backup of a virtual machine may be received at a storage system from a primary system hosting the virtual machine. The storage system may generate a corresponding backup view for the backed up virtual machine.

The data associated with a backup view corresponding to the virtual machine is immutable. The backup view corresponding to the virtual machine is cloned to enable the selected virtual machine disk image file backup to be updated. A backup view corresponding to a virtual machine is comprised of a root node, one or more levels of one or more intermediate nodes associated with the root node, and one or more leaf nodes associated with an intermediate node of the lowest intermediate level. A backup view that includes the selected virtual machine disk image file is cloned by copying the root node of the backup view corresponding to the virtual machine. The cloned backup view of the selected virtual machine disk image file backup may correspond to the version of the selected virtual machine disk image file backup that is mounted.

The storage system may include an application that is capable of mounting a virtual machine disk image file backup. The application may perform a change root operation (e.g., chroot operation) that changes the apparent root of a filesystem namespace to be the root of the virtual machine associated with the selected virtual machine disk image file backup included in the cloned backup view. The files and directories of the virtual machine may be accessible after the selected virtual machine disk image file backup is mounted.

At 506, one or more updates are applied to the mounted version of the selected virtual machine disk image file backup. A storage system may include a virtual machine update manager that is configured to apply one or more updates to a mounted virtual machine disk image file backup. The storage system may access an update repository that is configured to store one or more updates for a virtual machine. An update may be a software package. An update may be a script that when executed by the virtual machine update manager, causes a mounted virtual machine disk image file backup to be updated.

In some embodiments, an update is a software patch. The software patch may fix known security vulnerabilities associated with a virtual machine. In some embodiments, an update modifies a configuration file that is associated with the virtual machine. For example, network settings associated with a virtual machine may be changed with an update that is stored in the update repository. In some embodiments, an update deletes certain types of data that are stored in the virtual machine disk image file backup. For example, data that is associated with a particular user may be deleted.

The storage system may include an update manager that determines which of the one or more updates stored in the update repository are to be applied to the mounted version of the selected virtual machine disk image file backup based on a backup update policy. A user associated with a primary system hosting the virtual machine that was backed up to the storage system may maintain one or more backup update policies. The user may update the one or more backup update policies as new vulnerabilities associated with virtual machines are discovered. The storage system may inspect the one or more backup update policies to determine which update(s) to apply to the mounted version of the selected virtual machine disk image file backup.

A backup update policy may indicate that a virtual machine that was backed up before or after a particular date is to be updated with one or more particular updates. A backup update policy may indicate that a virtual machine running a particular operating system is to be updated with one or more particular updates. An update may have a corresponding criticality score. A backup update policy may indicate that a virtual machine is to be updated with any update having a corresponding criticality score above a criticality threshold.

In some embodiments, the storage system applies some of the updates stored in the update repository based on the backup update policy. In some embodiments, the storage system applies all of the updates stored in the update repository based on the backup update policy. The storage system may apply the one or more updates in an order based on one or more backup update policies. A backup update policy may indicate that an update to fix a critical security vulnerability is to be applied before an update to change a configuration of the virtual machine.

The cloned backup view that includes the selected virtual machine disk image file backup is updated based on the one or more updates applied to the mounted version of the selected virtual machine disk image file backup. The storage system may modify the cloned backup view corresponding to the selected virtual machine disk image file backup to reflect the changes that were made to the mounted version of the selected virtual machine disk image file backup. This enables the data associated with the updated virtual machine disk image file backup to be relocated in the event the updated virtual machine disk image file backup is to be restored, replicated, or migrated. Metadata associated with the cloned backup view corresponding to the selected virtual machine disk image file backup may be updated to indicate that the virtual machine disk image file backup has been updated. For example, a leaf node that corresponds to a file inode may be updated to store a value that indicates the virtual machine disk image file backup to which the leaf node points has been updated.

The storage system may store two different versions of a virtual machine backup after the cloned backup view is updated. The first version is the original backup version and the second version is an updated version of the virtual machine backup. The storage system may provide a user associated with a primary system an option to restore either the original backup version or the updated version of the virtual machine backup.

Figure 6:
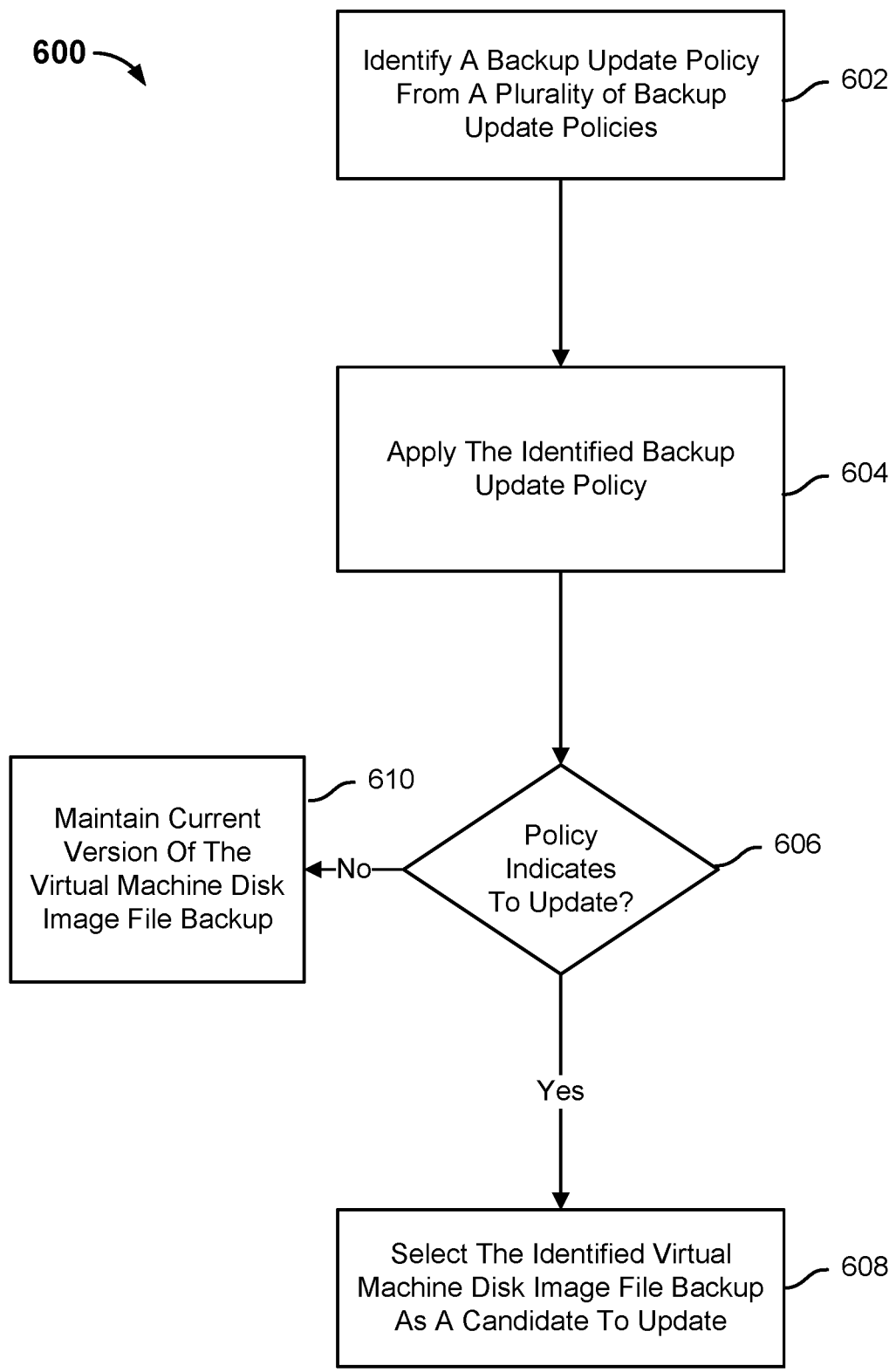
FIG. 6 is a flow chart illustrating a process for selecting a virtual machine disk image file backup to update in accordance with some embodiments.

FIG. 6 is a flow chart illustrating a process for selecting a virtual machine disk image file backup to update in accordance with some embodiments. In the example shown, process 600 may be implemented by a storage system, such as storage system 112. In some embodiments, process 600 is implemented to perform some or all of step 502 of process 500. Process 600 may be repeated for each of the backup update policies. Process 600 may be applied to each of the virtual machine disk image file backups.

At 602, a backup update policy is identified from a plurality of backup update policies. A user associated with a primary system hosting one or more virtual machines may establish a plurality of backup update policies for backed up virtual machines. Since it may not be practical to update all the backed up virtual machines, the user (e.g., an administrator) may establish the plurality of backup update policies to ensure that a specific subset of the virtual machine backups are updated (e.g., the important virtual machines). The storage system may identify one of the backup update policies and determine whether the identified backup update policy indicates if any of the virtual machine disk image file backups need to be updated.

In some embodiments, a backup update policy may indicate that a latest version of a virtual machine is to be updated. In some embodiments, a backup update policy may indicate that a version of a virtual machine that lacks one or more critical security patches is to be updated. In some embodiments, a backup update policy may indicate that a virtual machine disk image file backup that was created after a particular date is to be updated. In some embodiments, a backup update policy indicates that a newly added virtual machine disk image file backup is given priority over older virtual machine disk image file backups.

At 604, the identified backup update policy is applied to information associated with a virtual machine disk image file backup to determine whether the virtual machine disk image file backup is a candidate to update. The storage system may store a data structure (e.g., list, table, etc.) that identifies the plurality of virtual machine disk image file backups. The data structure may include an entry for each of the plurality of virtual machine disk image file backups. The entry may store information associated with a virtual machine disk image file backup, such as a backup time, a size of the virtual machine disk image file backup, an operating system associated with the virtual machine disk image file backup, a host machine, version information, updates that have been applied, etc.

The storage system may apply the identified backup update policy to the information associated with the virtual machine disk image file backup. For example, a backup update policy may indicate that a latest version of a virtual machine is to be updated and the storage system may compare the version information associated with the identified virtual machine disk image file backup to determine if the identified virtual disk image file backup is the latest version of a virtual machine.

A backup update policy may indicate that a version of a virtual machine that lacks one or more critical security patches is to be updated and the storage system may compare the update information associated with the identified virtual machine disk image file backup to determine if the one or more critical security patches have been applied to the identified virtual disk image file backup. In some embodiments, the storage system compares the operating system information associated with the virtual machine disk image file backup with the backup update policy to determine if the virtual machine disk image file backup is to be updated. For example, a policy may indicate that virtual machines that have an operating system version of X are to be updated with security patches Y and Z.

A backup update policy may indicate that a virtual machine disk image file backup that was created after a particular date is to be updated and the storage system may compare the backup time associated with the identified virtual machine disk image backup with the particular date to determine if the virtual machine disk image backup was created after the particular date.

At 606, it is determined whether the identified backup update policy indicates to update the virtual machine disk image file backup. In the event the identified backup update policy indicates to update the virtual machine disk image file backup, process 600 proceeds to 608 and the virtual machine disk image file backup is selected as a candidate to update. In the event the identified backup update policy does not indicate to update the virtual machine disk image file backup, process 600 proceeds to 610 and the current version of the virtual machine disk image file backup is maintained (e.g., the non-updated version).

Figure 7:
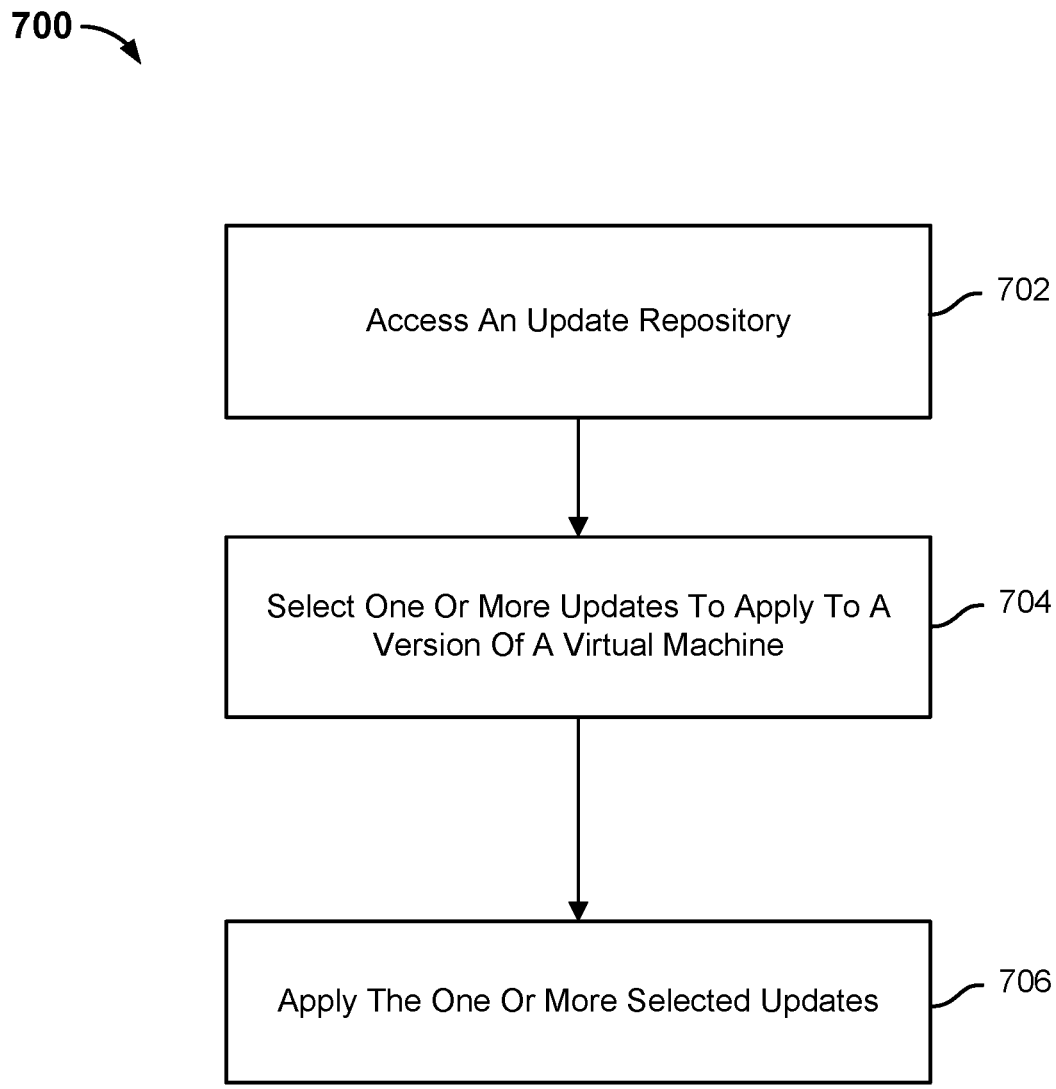
FIG. 7 is a flow chart illustrating a process for applying updates to a version of a virtual machine in accordance with some embodiments.

FIG. 7 is a flow chart illustrating a process for applying updates to a version of a virtual machine in accordance with some embodiments. In the example shown, process 700 may be implemented by a storage system, such as storage system 112. In some embodiments, process 700 is implemented to perform some or all of step 506 of process 500.

At 702, a storage system accesses an update repository. An updated repository may store one or more updates for a virtual machine. An update may be a software package. An update may be a script that when executed causes a mounted virtual machine disk image file to be updated. In some embodiments, an update is a software patch. The software patch may fix known security vulnerabilities associated with a virtual machine. In some embodiments, an update modifies a configuration file that is associated with the virtual machine. For example, network settings associated with a virtual machine may be changed with an update that is stored in the update repository. In some embodiments, an update deletes certain types of data that are stored in the virtual machine disk image file backup. For example, data that is associated with a particular user may be deleted.

At 704, one or more updates to apply to a version of a virtual machine are selected. A version of a virtual machine is determined based on information associated with the virtual machine that is stored by the storage system. The update repository may store one or more updates that are to be applied to the determined version of the virtual machine. The update repository may also store one or more updates that are to be applied to a different version of the virtual machine.

The storage system may determine which of the one or more updates stored in the update repository are to be applied to the mounted version of the selected virtual machine disk image file backup based on a backup update policy.

A user associated with a primary system hosting the virtual machine that was backed up to the storage system may maintain one or more backup update policies. The user may update the one or more backup update policies as new vulnerabilities associated with virtual machines that are discovered. The user may indicate that any critical vulnerabilities discovered in the future are to be automatically selected and applied. The storage system may inspect the one or more backup update policies to determine which update(s) to apply to the version of the virtual machine.

A backup update policy may indicate that a virtual machine that was backed up before a particular date is to be updated with one or more particular updates. A backup update policy may indicate that a virtual machine running a particular operating system is to be updated with one or more particular updates. An update may have a corresponding criticality score. A backup update policy may indicate that a virtual machine is to be updated with any update having a corresponding criticality score above a criticality threshold.

In some embodiments, the storage system applies some of the updates stored in the update repository based on the backup update policy. In some embodiments, the storage system applies all of the updates stored in the update repository based on the backup update policy.

At 706, the one or more selected updates are applied to the version of the virtual machine. The storage system may include a virtual machine update manager that is configured to apply the one or more selected updates to a mounted virtual machine disk image file backup. The virtual machine update manager may determine an order in which the one or more updates are to be applied to the mounted virtual machine disk image file backup based on one or more backup update policies. A backup update policy may indicate that an update to fix a critical security vulnerability is to be applied before an update to change a configuration of the virtual machine.

Figure 8:
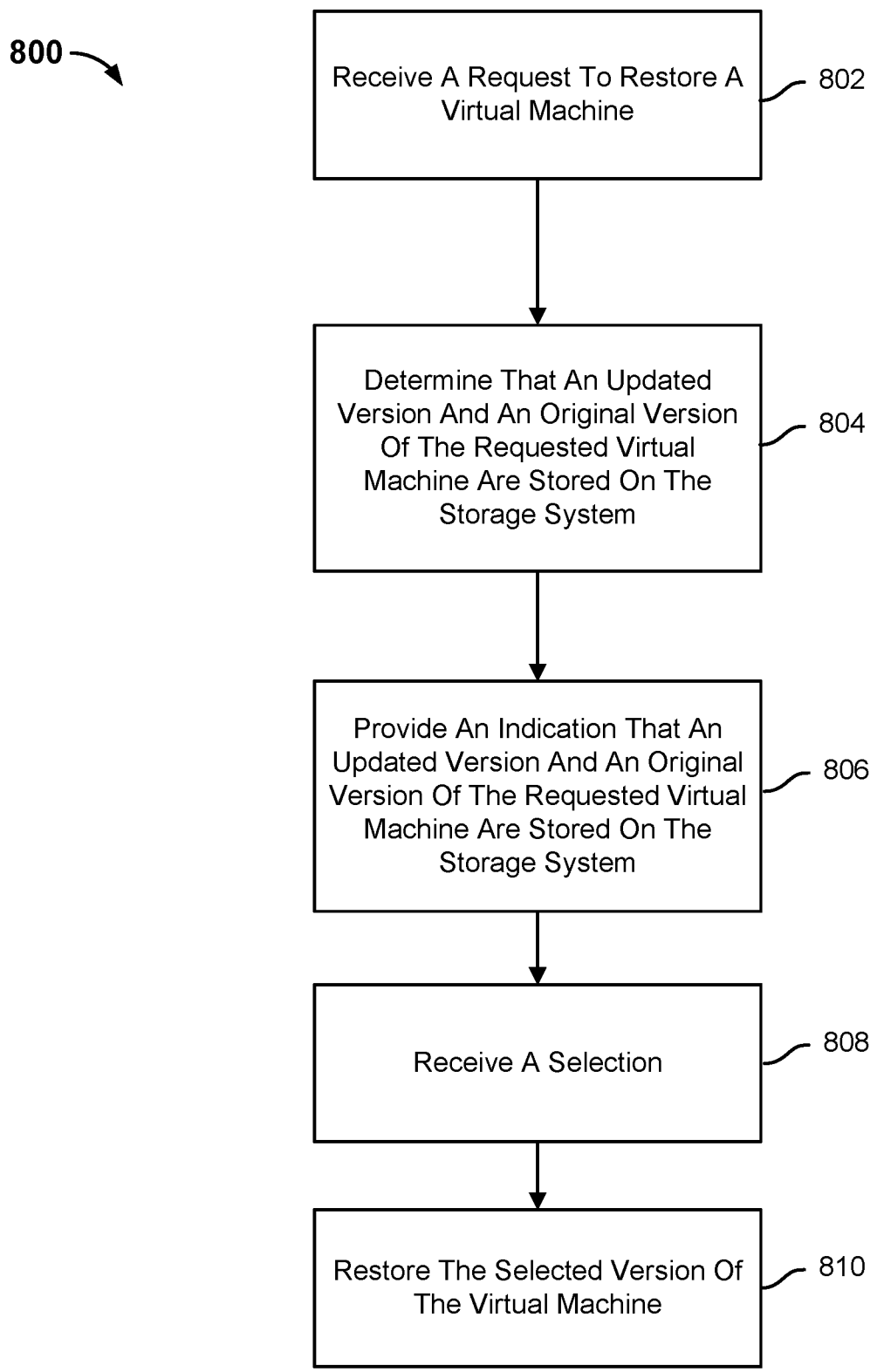
FIG. 8 is a flow chart illustrating a process for restoring a virtual machine disk image file backup in accordance with some embodiments.

FIG. 8 is a flow chart illustrating a process for restoring a virtual machine disk image file backup in accordance with some embodiments. In the example shown, process 800 may be implemented by a storage system, such as storage system 112.

At 802, a request to restore a virtual machine is received. The request may be received from a system providing a production environment, such as the primary system that hosted the virtual machine and backed up the virtual machine, or a different system. At 804, it is determined that a family of virtual machines that include one or more updated versions of the virtual machine disk image file backup and the original version of the virtual machine disk image file backup are stored on the storage system. At 806, an indication that a family of virtual machines that include one or more updated versions of the virtual machine disk image file backup and the original version of the virtual machine disk image file backup are stored on the storage system is provided to the requesting system. At 808, a selection of a virtual machine to restore is received from the requesting system.

At 810, the selected version of the virtual machine is restored. The storage system may traverse the backup view of data corresponding to the selected version of the virtual machine to locate the data associated with the selected version of the virtual machine. The located data may be restored to the requesting system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   discovering one or more new security vulnerabilities associated with a plurality of virtual machines after a plurality of virtual machine disk image file backups have been stored on a backup storage of a storage system;
   based on a backup update policy, selecting, by the storage system, a virtual machine disk image file backup that includes at least one of the one or more new security vulnerabilities among the plurality of virtual machine disk image file backups stored on the backup storage of the storage system;
   mounting a version of the selected virtual machine disk image file backup;
   selecting one or more of a plurality of virtual machine updates stored at an update repository to apply to the version of the selected virtual machine disk image file backup based on the backup update policy, wherein the backup update policy indicates which of the plurality of virtual machine updates are to be applied to the selected virtual machine disk image file backup;
   based on the backup update policy, applying, by the storage system, the one or more selected virtual machine updates to the mounted version of the selected virtual machine disk image file backup to at least in part resolve the at least one of the one or more new security vulnerabilities that was discovered after the selected virtual machine disk image file backup was backed up from a source system to the backup storage of the storage system without restoring the selected virtual machine disk image file backup; and
   storing the updated version of the selected virtual machine disk image file backup.

2. The method of claim 1, wherein selecting the virtual machine disk image file backup among the plurality of virtual machine disk image file backups comprises applying the backup update policy to information associated with the virtual machine disk image file backup.

3. The method of claim 2, wherein the backup update policy indicates the virtual machine disk image file backup is to be updated in response to determining that the version of the virtual machine disk image file backup is a latest version of a virtual machine backup.

4. The method of claim 2, wherein the backup update policy indicates the virtual machine disk image file backup is to be updated in response to determining that the information associated with the virtual machine disk image file backup indicates the virtual machine disk image file backup lacks one or more critical updates.

5. The method of claim 2, wherein selecting the virtual machine disk image file backup among the plurality of virtual machine disk image file backups further comprises determining that the backup update policy indicates to update the virtual machine disk image file backup.

6. The method of claim 1, wherein the version of the selected virtual machine disk image file backup is a cloned version of the virtual machine disk image file backup.

7. The method of claim 1, wherein mounting the version of the selected virtual machine disk image file backup includes setting an apparent root of a file system namespace to be a root of a virtual machine associated with the selected virtual machine disk image file backup.

8. The method of claim 1, wherein the update repository stores one or more updates for one or more non-selected virtual machine disk image file backups stored on the backup storage of the storage system.

9. The method of claim 1, wherein the updated version of the selected virtual machine disk image file backup is included in a catalog of available virtual machine disk image file backups.

10. The method of claim 1, further comprising receiving a request to restore a virtual machine associated with the selected virtual machine disk image file backup to a primary system.

11. The method of claim 10, further comprising restoring the selected virtual machine disk image file backup to the primary system.

12. The method of claim 1, further comprising providing an indication of an original version of the selected virtual machine disk image file backup and the updated version of the selected virtual machine disk image file backup.

13. The method of claim 12, further comprising:
receiving a selection between the original version of the selected virtual machine disk image file backup and the updated version of the selected virtual machine disk image file backup; and
providing the selected version of the selected virtual machine disk image file backup.

14. A computer program product, the computer program product being embodied in a non-transitory computer readable storage medium and comprising computer instructions for:
discovering one or more new security vulnerabilities associated with a plurality of virtual machines after a plurality of virtual machine disk image file backups have been stored on a backup storage of a storage system;
based on a backup update policy, selecting, by the storage system, a virtual machine disk image file backup that includes at least one of the one or more new security vulnerabilities among the plurality of virtual machine disk image file backups stored on the backup storage of the storage system;
mounting a version of the selected virtual machine disk image file backup;
selecting one or more of a plurality of virtual machine updates stored at an update repository to apply to the version of the selected virtual machine disk image file backup based on the backup update policy, wherein the backup update policy indicates which of the plurality of virtual machine updates are to be applied to the selected virtual machine disk image file backup;
based on the backup update policy, applying, by the storage system, the one or more selected virtual machine updates to the mounted version of the selected virtual machine disk image file backup to at least in part resolve the at least one of the one or more new security vulnerabilities that was discovered after the selected virtual machine disk image file backup was backed up from a source system to the backup storage of the storage system without restoring the selected virtual machine disk image file backup; and
storing the updated version of the selected virtual machine disk image file backup.

15. The computer program product of claim 14, wherein selecting the virtual machine disk image file backup among the plurality of virtual machine disk image file backups comprises applying the backup update policy to information associated with the virtual machine disk image file backup.

16. The computer program product of claim 15, wherein selecting the virtual machine disk image file backup among the plurality of virtual machine disk image file backups further comprises determining that the backup update policy indicates to update the virtual machine disk image file backup.

17. The computer program product of claim 15, wherein the backup update policy indicates the virtual machine disk image file backup is to be updated in response to determining that the information associated with the virtual machine disk image file backup indicates the virtual machine disk image file backup lacks one or more critical updates.

18. The computer program product of claim 14, wherein the updated version of the selected virtual machine disk image file backup is included in a catalog of available virtual machine disk image file backups.

19. The computer program product of claim 14, further comprising restoring the selected virtual machine disk image file backup to a primary system.

20. A storage system, comprising:
a processor; and
a memory coupled with the processor, wherein the memory is configured to provide the processor with instructions which when executed cause the processor to:
discover one or more new security vulnerabilities associated with a plurality of virtual machines after a plurality of virtual machine disk image file backups have been stored on a backup storage of a storage system;
based on a backup update policy, select a virtual machine disk image file backup that includes at least one of the one or more new security vulnerabilities among the plurality of virtual machine disk image file backups stored on the backup storage of the storage system;
mount a version of the selected virtual machine disk image file backup;
select one or more of a plurality of virtual machine updates stored at an update repository to apply to the version of the selected virtual machine disk image file backup based on the backup update policy, wherein the backup update policy indicates which of the plurality of virtual machine updates are to be applied to the selected virtual machine disk image file backup;

based on the backup update policy, apply the one or more selected virtual machine updates to the mounted version of the selected virtual machine disk image file backup to at least in part resolve the at least one of the one or more new security vulnerabilities that was discovered after the selected virtual machine disk image file backup was backed up from a source system to the backup storage of the storage system without restoring the selected virtual machine disk image file backup; and store the updated version of the selected virtual machine disk image file backup.

* * * * *